(12) United States Patent
Russell

(10) Patent No.: US 7,891,015 B2
(45) Date of Patent: Feb. 15, 2011

(54) HIGH-BANDWIDTH ACTUATOR DRIVE FOR SCANNING PROBE MICROSCOPY

(75) Inventor: William I. Russell, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 866 days.

(21) Appl. No.: 11/831,175

(22) Filed: Jul. 31, 2007

(65) Prior Publication Data

US 2009/0032703 A1 Feb. 5, 2009

(51) Int. Cl.
*G01Q 10/06* (2010.01)
(52) U.S. Cl. .................. 850/4; 850/1; 850/2; 850/3
(58) Field of Classification Search .................. None
See application file for complete search history.

(56) References Cited

U.S. PATENT DOCUMENTS

| | | | | |
|---|---|---|---|---|
| 4,801,879 | A * | 1/1989 | Spicer ...................... 324/751 |
| 5,376,790 | A * | 12/1994 | Linker et al. .................. 850/2 |
| 5,466,935 | A | 11/1995 | Ray et al. |
| 5,477,732 | A | 12/1995 | Yasue et al. |
| 5,496,999 | A * | 3/1996 | Linker et al. .................. 850/2 |
| 5,714,756 | A * | 2/1998 | Park et al. ..................... 850/6 |
| 5,723,775 | A | 3/1998 | Watanabe et al. |
| 5,729,015 | A | 3/1998 | Tong |
| 5,801,381 | A | 9/1998 | Flecha et al. |
| 5,804,710 | A * | 9/1998 | Mamin et al. ................. 73/105 |
| 5,877,891 | A * | 3/1999 | Park et al. .................. 359/372 |
| 5,883,705 | A | 3/1999 | Minne et al. |
| 5,939,719 | A * | 8/1999 | Park et al. ..................... 850/1 |
| 6,006,595 | A | 12/1999 | Kitamura |
| 6,038,916 | A | 3/2000 | Cleveland et al. |
| 6,057,547 | A * | 5/2000 | Park et al. ................... 850/10 |
| 6,094,971 | A | 8/2000 | Edwards et al. |

(Continued)

FOREIGN PATENT DOCUMENTS

WO   WO 2005/040043   5/2005

(Continued)

OTHER PUBLICATIONS

Ando et al., "A high-speed atomic force microscope for studying biological macromolecules", PNAS Oct. 23, 2001. vol. 98 No. 22. pp. 12468-12472.

(Continued)

*Primary Examiner*—Bernard E Souw
*Assistant Examiner*—Andrew Smyth
(74) *Attorney, Agent, or Firm*—Patterson Thuente Christensen Pedersen P.A.

(57) ABSTRACT

An actuator subsystem for use in a scanning probe microscope (SPM) system having a probe for measuring a sample comprises and actuator and an actuator driving circuit. The actuator operates in the SPM system to generate relative motion between the probe and the sample while the SPM system collects data indicative of a property of the sample. The relative motion includes a range of motion of at least 1 micron. The actuator driving circuit applies a drive signal to the actuator to cause the relative motion, and has a small signal bandwidth of at least 200 kHz with a phase lag of not more than 100 degrees within the small signal bandwidth.

15 Claims, 44 Drawing Sheets

U.S. PATENT DOCUMENTS

| | | | |
|---|---|---|---|
| 6,130,427 A * | 10/2000 | Park et al. | 850/26 |
| 6,265,718 B1 * | 7/2001 | Park et al. | 850/10 |
| 6,297,502 B1 | 10/2001 | Jarvis et al. | |
| 6,318,159 B1 * | 11/2001 | Chen et al. | 73/105 |
| 6,677,697 B2 | 1/2004 | Struckmeier et al. | |
| 6,694,817 B2 * | 2/2004 | Degertekin et al. | 73/661 |
| 6,795,265 B2 | 9/2004 | Murphy et al. | |
| 6,845,655 B2 | 1/2005 | Van Der Weide et al. | |
| 6,941,798 B2 | 9/2005 | Yamaoka et al. | |
| 7,044,007 B2 | 5/2006 | Struckmeier et al. | |
| 7,111,504 B2 | 9/2006 | Blumberg et al. | |
| 7,155,964 B2 | 1/2007 | Huang et al. | |
| 7,387,035 B2 | 6/2008 | Struckmeier et al. | |
| 2003/0041669 A1 * | 3/2003 | Degertekin et al. | 73/651 |
| 2005/0269510 A1 | 12/2005 | Chang | |
| 2006/0001332 A1 | 1/2006 | Ollila | |
| 2008/0078240 A1 | 4/2008 | Hansma | |
| 2008/0087077 A1 | 4/2008 | Mininni | |
| 2008/0121813 A1 | 5/2008 | Young | |
| 2008/0277582 A1 * | 11/2008 | Shi et al. | 250/309 |

FOREIGN PATENT DOCUMENTS

| | | |
|---|---|---|
| WO | WO 2005/060014 | 6/2005 |

OTHER PUBLICATIONS

Written Opinion of the International Searching Authority for International Application No. PCT/US2008/071795 dated Feb. 11, 2010.

International Search Report for International Application No. PCT/US2008/071795 dated Jan. 19, 2009.

Leach Jr., Zobel Network Design (From the book Introduction of Electroacoustics and Audio Amplifier Design, Second Edition, Revised Printing) 2001. pp. 1-2.

Li et al., "Ultra-Sensitive NEMS-based cantilevers for sensing, scanned probe and very high-frequency applications", 2007. pp. 114-120.

Application Note, ThermalTrak Audio Output Transistors, On Semiconductor, 2005. pp. 1-4.

Complementary ThermalTrak Transistors, On Semiconductor, 2006. pp. 1-7.

Application Note 38, Apex Microtechnology, Loop Stability with Reactive Loads. pp. 1-10.

Data Sheet, Apex Microtechnology, MP108 MP108A, Power Operational Amplifier, pp. 1-4.

Data Sheet, Apex Microtechnology, MP38 MP38A, Power Operational Amplifier, pp. 1-4.

Application Note, Apex Microtechnology, PA78 Design Ideas, Power Operational Amplifier Design Ideas. pp. 1-6.

McDermott, Power Point Presentation. Nanotechnology Basics and Biomedical Applications Workshop."Introduction to Scanning Probe Microscopy: Applications of Scanning Force Microscopy", Department of Chemistry and National Institute of Nanotechnology. University of Alberta.

* cited by examiner

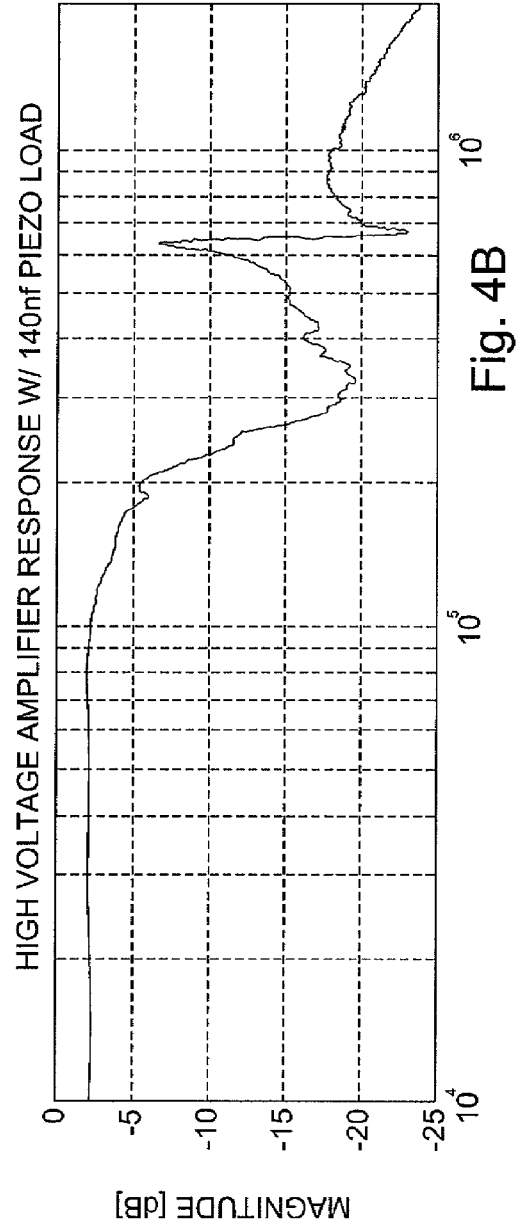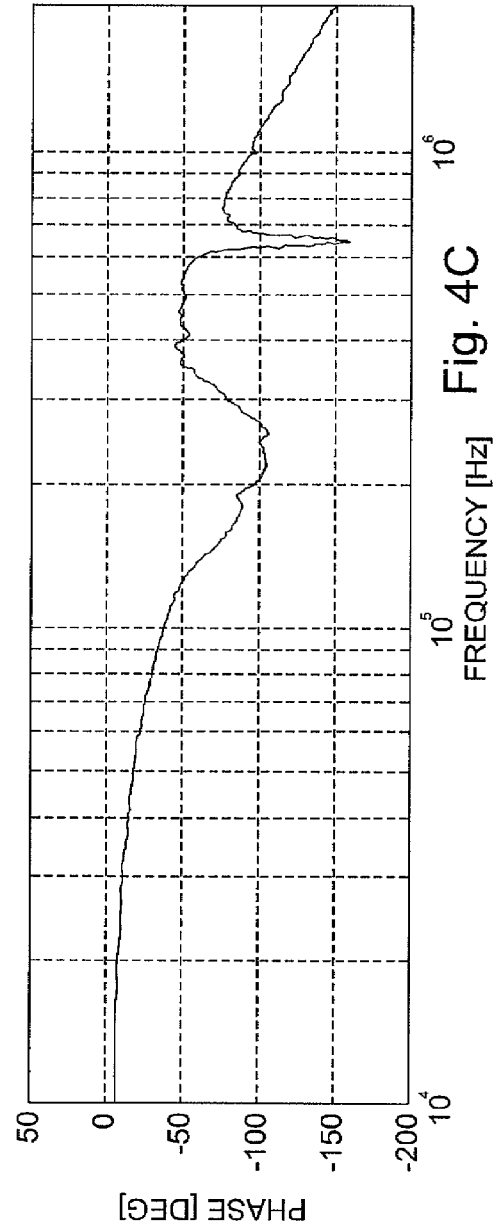

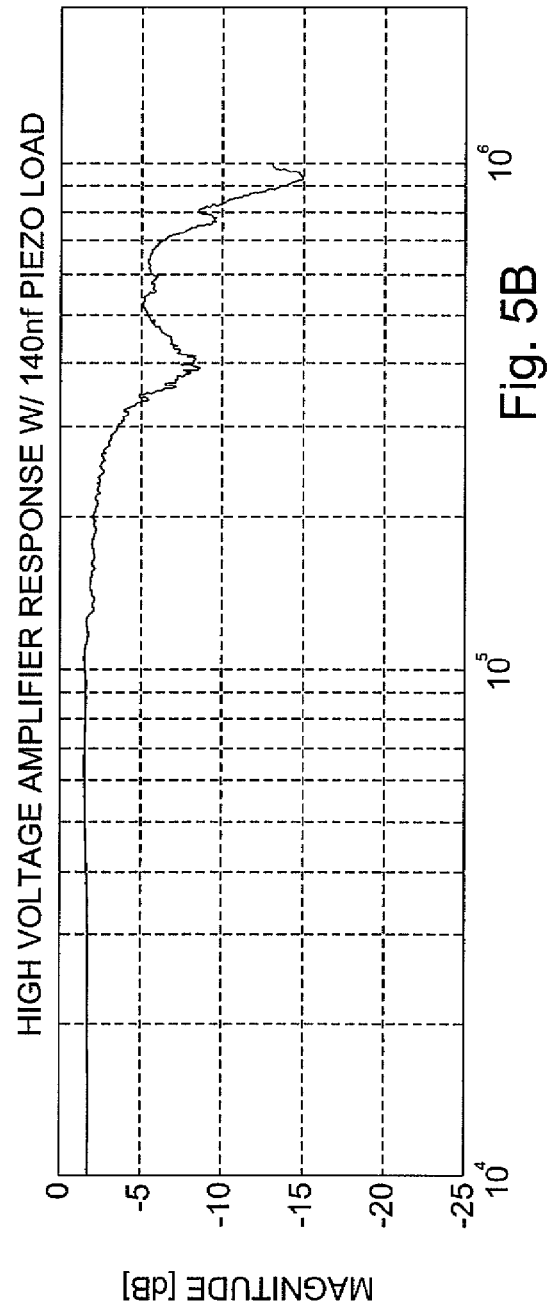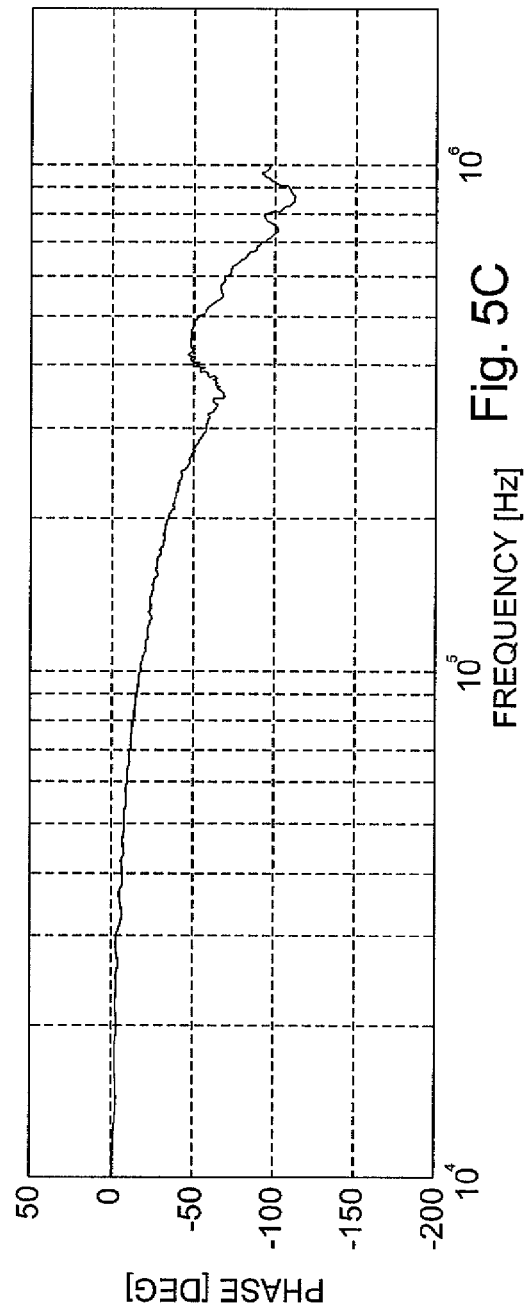

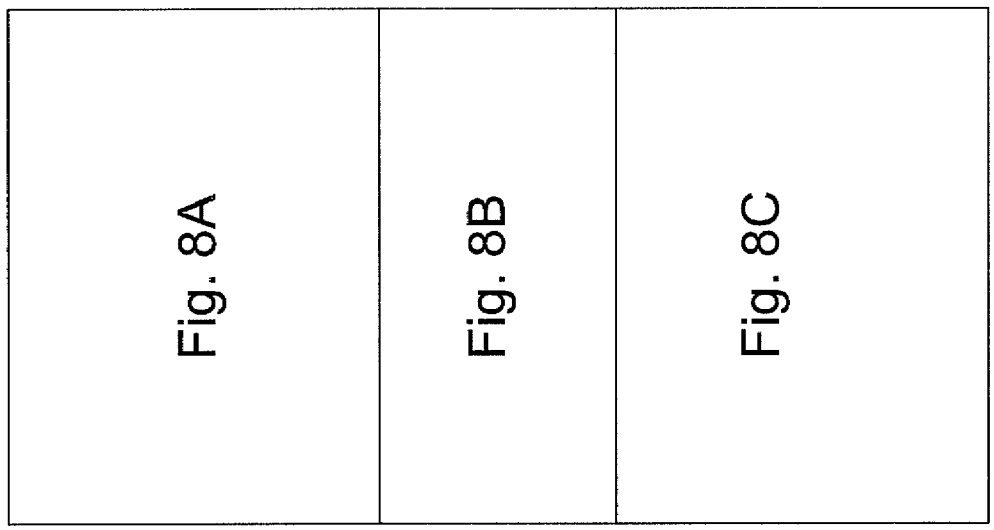

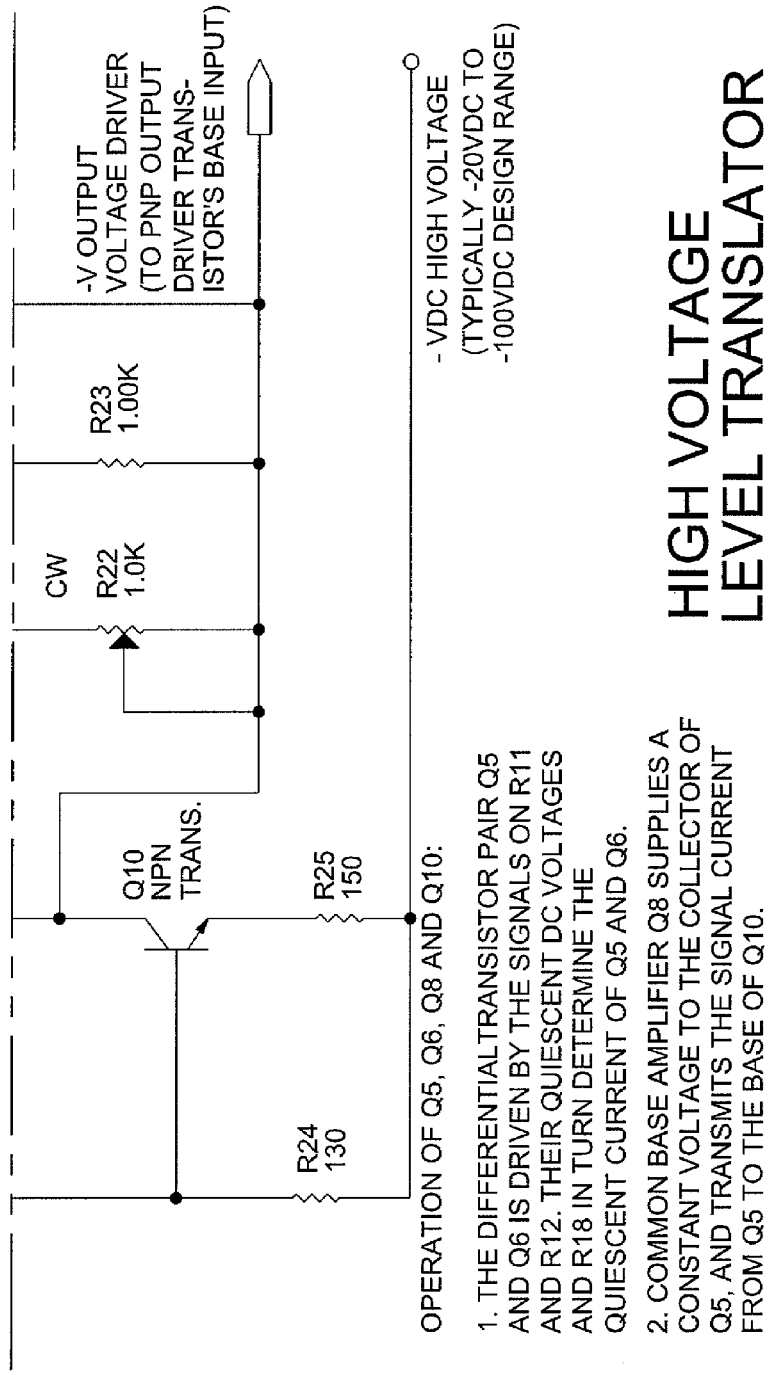

| Fig. 10C | Fig. 10F |
| --- | --- |
| Fig. 10B | Fig. 10E |
| Fig. 10A | Fig. 10D |

Fig. 10

| Fig. 12A | Fig. 12B | Fig. 12C |
|---|---|---|
| Fig. 12D | Fig. 12E | Fig. 12F |

Fig. 12

HIGH-BANDWIDTH ACTUATOR DRIVE FOR SCANNING PROBE MICROSCOPY

FIELD OF THE INVENTION

The present invention relates generally to scanning probe microscopy and, more particularly, to driving and controlling the probe actuator of a scanning probe microscope in at least one axis of motion.

BACKGROUND OF THE INVENTION

Scanning probe microscopes (SPMs), such as the atomic force microscope (AFM), are instruments which typically use a sharp tip to characterize the surface of a sample down to nanoscale dimensions. The term nanoscale as used for purposes of this invention refers to dimensions smaller than one micrometer. SPMs monitor the interaction between the sample and the probe tip. By providing relative scanning movement between the tip and the sample, surface characteristic data can be acquired over a particular site on the sample, and a corresponding map of the site can be generated. Because of their resolution and versatility, SPMs are important measurement devices in many diverse fields ranging from semiconductor manufacturing to biological research. In other applications, SPM systems may be used for measuring nanomechanical properties of a sample.

The probe of a typical SPM includes a very small cantilever fixed to a support at its base and having a sharp probe tip extending from the opposite, free end. The probe tip is brought very near to or into contact with a surface of a sample to be examined, and the deflection of the cantilever in response to the probe tip's interaction with the sample is measured with an extremely sensitive deflection detector such as an optical lever system as described, for example, in Hansma et al. U.S. Pat. No. RE 34,489, or some other deflection detector such as strain gauges, capacitance sensors, etc. The probe is scanned over a surface using a high resolution three-axis scanner acting on the sample support, the probe, or a combination of both. The instrument is thus capable of measuring the topography or other surface properties or nanomechanical properties of the sample.

SPMs may be configured to operate in a variety of modes, including modes for measuring, imaging, or otherwise inspecting a surface, and modes for measuring nanomechanical properties of a sample. In a contact mode operation, the microscope typically scans the tip across the surface of the sample while maintaining a constant probe-sample interaction force. In an oscillation mode of operation, sometimes referred to as tapping mode, the tip of the SPM is oscillated while interacting with the sample at or near a resonant frequency of the cantilever of the probe. The amplitude or phase angle of this oscillation is affected by the probe-sample interaction, and changes in the oscillation are sensed.

As the probe is scanned over the surface of the sample, a probe positioning control system monitors the interaction of the probe with the sample surface such as, for example, deflection of the cantilever (in the case of contact mode), or changes in the oscillation amplitude or phase angle (in the case of oscillating mode). The control system adjusts the probe's position (or average position in the case of oscillating mode) relative to the sample to maintain a constant probe-sample interaction. The position adjustment thus tracks the topography of the sample. In this way, the data associated with the position adjustment can be stored, and processed into data that characterizes the sample. This data can be used to construct an image of the inspected sample's surface, or to make certain measurements of selected surface features (such as, for example, a height of the feature).

The probe position adjustment is effected by a cantilever positioning actuator that is driven by a driving circuit. Various technologies for cantilever actuators are known, including piezoelectric and magnetic transducers. The driving circuit generates a probe positioning signal, and amplifies the probe positioning signal to produce a driving signal that is applied to the actuator. The driving signal continuously repositions the probe's separation distance from the sample to track an arbitrary topography of the sample's surface. Accordingly, the driving signal has a bandwidth from zero hertz to a frequency associated with the maximum operating bandwidth of the SPM, which corresponds to the maximum speed at which the probe can track the topography of the surface of the sample.

To increase the speed at which the sample can be inspected, the bandwidth of the driving signal must be increased commensurately. Achieving a high driving signal bandwidth presents a number of challenges. These include generating the driving power at high frequencies and maintaining stable operation over the operating bandwidth. At the higher operating frequencies, the transfer function of the actuator driving system exhibits a roll-off in gain and greater phase shift between the probe positioning signal and the cantilever. As a practical matter, the cantilever control system must be able to drive the actuator effectively, and remain stable over the operating bandwidth of the SPM. Accordingly, the actuator driving system must not produce a phase shift of 180 degrees or more while the gain is greater than unity in order to avoid a positive feedback scenario.

Typically, designers of SPM systems are constrained by a phase budget that must be met by the combination of every subsystem and component involved in the driving and control of the SPM in order to not exceed a phase shift of 180 degrees. Contributors to phase offset include the cantilever itself, the actuator, the driving signal amplifier, and the probe positioning control system, which includes components such as a displacement sensor, an analog-to-digital converter, a demodulator, and an RMS amplifier.

Conventional amplifiers driving piezoelectric actuators typically have an internal feedback network that includes frequency compensation to ensure stability of the amplifier circuit in the form of a separate feedback loop that is nested within the actuator driving control system. This frequency compensation internal to the driving amplifier circuit substantially reduces the amplifier's gain at the high frequencies and introduces additional phase delay, thereby restricting the amplifier's ability to drive the actuator at those high frequencies, and presenting a greater contribution to the phase offset of the actuator control system.

In SPM systems, a common cause of instability in the driving signal amplifier is the actuator's reactive loading characteristics on the driving signal amplifier. For instance, piezoelectric actuators present a capacitive load that can vary widely over frequency. Under certain conditions, the reactive nature of this capacitive load can cause uncontrolled oscillations in the amplifier circuit. To ensure that the amplifier circuit remains stable, a load-isolating resistance is typically placed at the output of the amplifier. While the load-isolating resistance beneficially stabilizes the amplifier, it does so at the cost of introducing another phase offset into the cantilever control system, further limiting the overall operating bandwidth.

Conventional general-purpose amplifiers and amplifier stabilization techniques, which are not adapted specifically for SPM applications, suffer from these, and various other shortcomings when applied to high-speed SPM applications.

Accordingly, an actuator-driving amplifier suitable for high-speed SPM applications is needed that provides stable, high-gain, high-bandwidth performance while consuming as little of the SPM cantilever control loop phase budget as possible.

SUMMARY OF THE INVENTION

One aspect of the invention is directed to an actuator subsystem for use in a scanning probe microscope (SPM) system having a probe for measuring a sample. The actuator subsystem comprises an actuator and an actuator driving circuit. The actuator operates in the SPM system to generate relative motion between the probe and the sample while the SPM system collects data indicative of a property of the sample. The relative motion includes a range of motion of at least 1 micron.

The relative motion can be produced by various techniques, including moving the probe while maintaining the sample in a fixed position, or vice-versa; or moving both, the probe, and the sample. The actuator driving circuit applies a drive signal to the actuator to cause the relative motion, and has a small signal bandwidth of at least 200 kHz with a phase lag of not more than 100 degrees within the small signal bandwidth. One advantage of the actuator driving circuit that can achieve such a bandwidth such with limited phase lag while driving an actuator that can create a displacement of greater than one micron is the ability to achieve substantially improved throughput of the SPM system to previously unattainable levels.

In certain embodiments, the relative motion is responsive to a changing nanoscale interaction between the probe and the sample. Examples of types of nanoscale interaction include, without limitation, contact, tapping, electric force, magnetic force, friction, adhesion, near-field optical, thermal, Van der Waals, or other local forces and/or fields that are mapped on scales with resolution better than 1 um and typically less than 100 nm. As an example, the nanoscale interaction can change as a result of the probe encountering various topographic features of the sample as a scanning relative motion of the probe and the sample causes the probe to traverse the sample.

In one embodiment, the phase lag within the small signal bandwidth is not greater than 40 degrees. In one embodiment, the actuator has a nominal capacitance of greater than 10 nanoFarads. In one embodiment, the actuator has a nominal capacitance of greater than 100 nanoFarads. In one embodiment, the actuator is a piezoelectric stack. In one embodiment, the actuator driving circuit exhibits a transfer function having at least one phase lag characteristic selected from the group consisting of: at less than 100 kHz, a phase lag of not more than about 20 degrees; at less than 200 kHz, a phase lag of not more than about 40 degrees; and at less than 300 kHz, a phase lag of not more than about 60 degrees. In one embodiment, the small signal bandwidth includes zero Hertz. In one embodiment, the actuator driving circuit has a current drive capable of driving the actuator with a slew rate of at least 33 kV/sec.

In one type of embodiment, the actuator driving circuit includes at least one amplification stage, and a substantially non-reactive feedback network limits a gain of the at least one amplification stage. In a related embodiment, a differential operational amplifier at a front end stage of the at least one amplification stage feeds a subsequent stage that includes a differential transistor pair.

In one embodiment, the actuator subsystem further comprises an actuator control system that operates to monitor the relative motion and to adjust the drive signal based on the relative motion to maintain a desired relative motion characteristic based on a topography of the sample.

In another related embodiment, the actuator driving circuit includes a plurality of amplification stages and an output driver stage that includes a temperature tracking device thermally coupled to a current driving device. The temperature tracking device is fed via an electronic threshold circuit that is thermally coupled to the temperature tracking device. The electronic threshold circuit and the temperature tracking device cooperate to control a bias current for the current driving device to prevent a thermal runaway condition of the current driving device. The electronic threshold circuit can be adjustable.

In another type of embodiment, the actuator driving circuit is electrically coupled with the actuator via a load-isolating impedance. At a low end frequency of the small signal bandwidth, the load-isolating impedance presents a negligible effect on a transfer function of the actuator driving circuit; whereas at a high end frequency of the small signal bandwidth the load-isolating impedance approaches a specific non-negligible resistance that presents a non-negligible effect on the transfer function.

Another aspect of the invention is directed to a scanning probe microscope (SPM) system having a probe for-measuring a sample, and including at least one position actuator that operates to generate relative motion between the probe and the sample while the SPM system collects data indicative of a property of the sample. The relative motion includes a range of motion of at least 1 micron. The SPM system further includes an actuator driving circuit that applies a drive signal to the actuator to cause the relative motion. The actuator driving circuit includes at least one amplification stage with a substantially non-reactive feedback network limiting a gain of the at least one amplification stage. A load isolating impedance that is less than about ten ohms is electrically situated between the actuator driving circuit and the at least one position actuator.

In one embodiment, the actuator driving circuit has a small signal bandwidth of at least 200 kHz with a phase lag of not more than 60 degrees within the small signal bandwidth. In one embodiment, the actuator driving circuit has a small signal bandwidth of at least 200 kHz with a phase lag of not more than 40 degrees within the small signal bandwidth. In one embodiment, the load isolating impedance includes a reactance. In one embodiment, the load isolating impedance includes an impedance network in series with an output of the actuator driving circuit, and the impedance network includes a resistance in parallel with an inductance. In one embodiment, the resistance is not greater than 10 ohms. In one embodiment, the resistance is not greater than about 2 ohms. In one embodiment, the impedance network comprises a resistor having a body and a pair of leads, and a coil of wire wound around at least a portion of the body and electrically connected to each of the leads. In one embodiment, the load isolating impedance includes an impedance network arranged across an output of the actuator driving circuit, and the impedance network includes a resistance in series with a capacitance. In one embodiment, values for the resistance and capacitance of the impedance network are selected such that the impedance network maintains a reactive load on the actuator driving circuit that is greater than a reactive load presented by the at least one position actuator.

A SPM system according to another aspect of the invention has a probe for measuring a sample, at least one position actuator that operates to generate relative motion between the probe and the sample while the SPM system collects data indicative of a property of the sample, and a driver circuit that has a substantially non-reactive feedback network limiting its gain. The driver circuit drives the at least one position actuator with an effective output impedance of less than about 10 ohms over an operating bandwidth of the position actuator.

In one embodiment, the SPM system further comprises a control system configured in a feedback arrangement with the position actuator, the probe, and the driver circuit, wherein the control system dictates the relative motion in response to a probe-sample interaction based on the topography of the sample. In one embodiment, the operating bandwidth includes zero hertz, and wherein the effective output impedance at zero hertz is less than 1 ohm. In one embodiment, a small signal bandwidth of the driver circuit includes 200 kHz, and wherein the effective output impedance includes a reactance.

A method of operating a SPM system having a probe for measuring a sample according to another aspect of the invention includes generating a relative motion between the probe and the sample using at least one position actuator having a nonlinear impedance, and applying a drive signal to the at least one position actuator using an actuator driving circuit. An additional impedance is provided across the actuator driving circuit that is trivial at a low end frequency of the operating bandwidth, and that is nontrivial at a high end frequency of the operating bandwidth. The additional load cooperates with the impedance of the actuator to present an overall impedance to the actuator driving circuit that has a higher power factor than the impedance of the actuator.

In an embodiment, the method further comprises providing a substantially non-reactive feedback network to limit a gain of the actuator driving circuit. In an embodiment, the method further comprises providing a load isolating impedance between the actuator driving circuit and the at least one position actuator, wherein the load isolating impedance includes a resistance in parallel with an inductance.

BRIEF DESCRIPTION OF THE DRAWINGS

The invention may be more completely understood in consideration of the following detailed description of various embodiments of the invention in connection with the accompanying drawings, in which:

FIGS. 4B-4C are a charts illustrating the amplitude and phase spectra, respectively, of the conventional actuator-driving amplifier of FIG. 4A.

FIGS. 5B and 5C are a charts illustrating the amplitude and phase spectra, respectively, of the actuator driving amplifier of FIG. 5.

FIGS. 7, 7A-7B, 8, 8A-8C, 9, 9A-9C, 10, and 10A-10F are annotated schematic diagrams illustrating example circuit portions of a SPM actuator-driving amplifier according to embodiments of the invention.

FIGS. 11, 11A-F, 12, and 12A-F, collectively, are a schematic diagram illustrating an example circuit utilized in a SPM actuator-driving amplifier according to one embodiment of the present invention.

Figure 1:
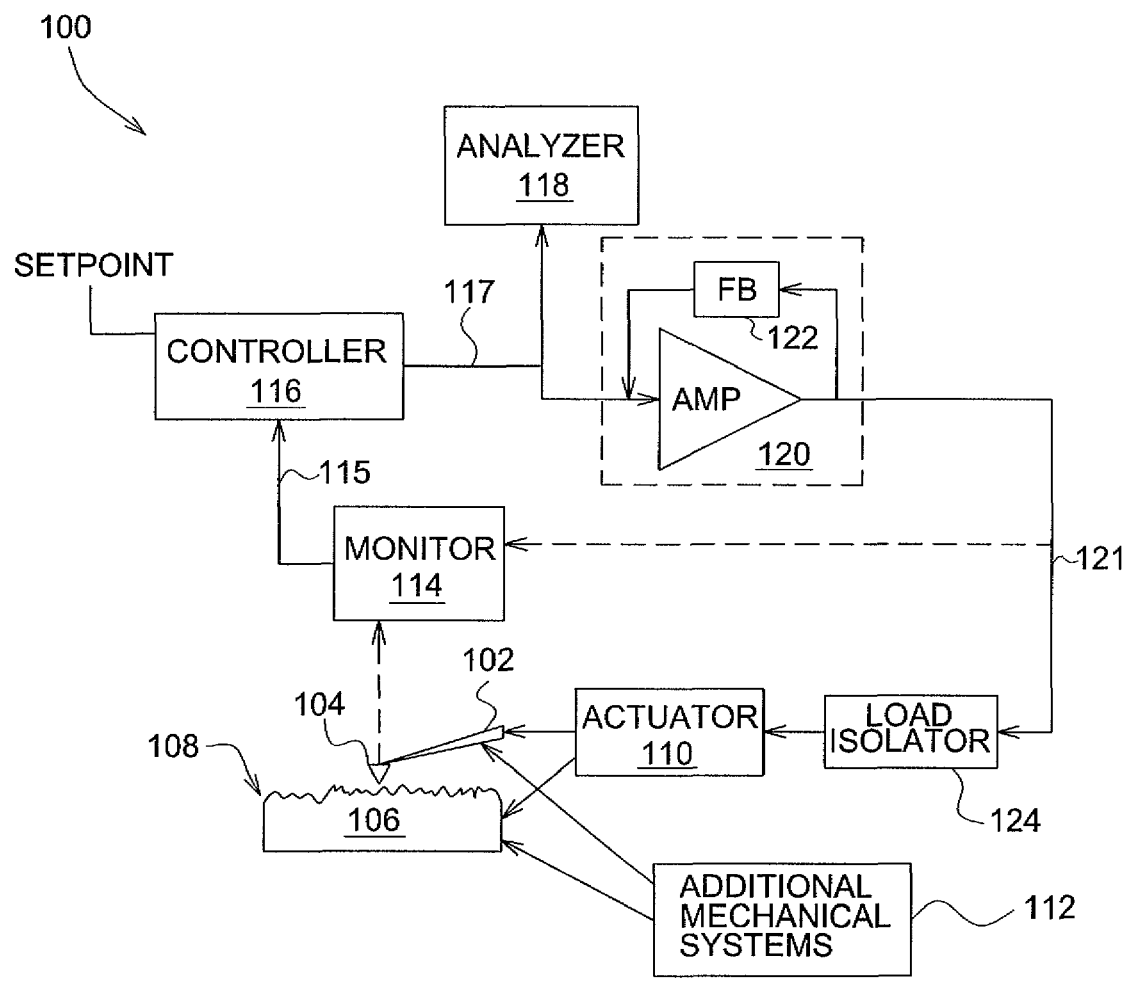
FIG. 1 is a top-level functional diagram illustrating a typical SPM system in which aspects of the present invention are incorporated.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1 is a top-level diagram illustrating a portion of a typical SPM system 100. System 100 includes cantilever 102 that holds probe 104. Probe 104 is used to inspect sample 106 having surface 108. Surface 108 has a certain topography, which is the subject of the inspection in certain applications. More generally, for samples that do not have major surfaces defined by corresponding aspect ratios, the topography of the sample can similarly be inspected by the SPM. The term topography is defined herein as a representation of a three-dimensional profile of a sample or of a portion of a sample, including, but not limited to, surface features of a sample.

The inspection is accomplished by situating probe 104 relatively to surface 108 by moving either cantilever 102, sample 106, or both, in order to establish a detectable interaction between surface 108 and probe 104. Probe 104 is scanned over or across the sample while probe 104 tracks the topography of sample 106, such as, for example, the topography of surface 108. Tracking of the topography includes, without limitation, following features present on the sample, such as, for example, lines, troughs, walls, corners, cavities, protrusions, and the like.

Figure 2A:
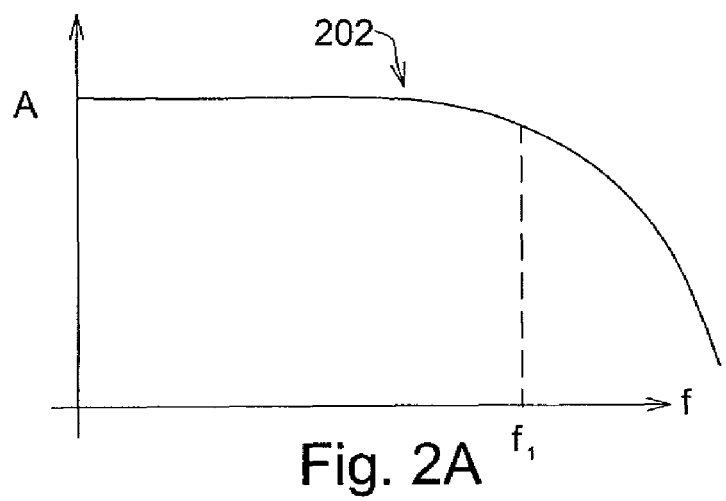
FIGS. 2A-2C generally illustrates amplitude spectra corresponding to actuator motions for topography tracking, oscillation mode, and coarse probe positioning, respectively.

In one embodiment, as illustrated in FIG. 1, SPM system 100 includes an actuator subsystem in which actuator 110 adjusts the probe-sample interaction by moving cantilever 102 relative to surface 108 to produce motion 202 as depicted in FIG. 2A. FIG. 2A illustrates the amplitude spectrum of motion 202, in which motion 202 has an amplitude A and a bandwidth based on rolloff frequency $f_1$. In related embodiments, actuator 110 may move sample 106 relative to cantilever 102, or actuator 110 may move both sample 106 and cantilever 102. The relative motion of cantilever 102 and sample 106 can be perpendicular or oblique to surface 108, and can include translational or rotational motion components. For the sake of simplicity, the relative repositioning of sample 106 and cantilever 102, which adjusts the level of probe-sample interaction shall be termed herein as motion in the z direction, or along the z axis.

Persons skilled in the relevant arts will appreciate that SPM system 100 can be constructed such that the mechanical structure, including the couplings between probe 104 and sample 106, reduce or avoid damping, resonating, or otherwise interacting with the relative motion between the probe and the sample. For instance, actuator 110 may be rigidly mounted to a chassis to which sample 106 is also rigidly mounted.

Additional mechanical systems 112 may also be provided that would include actuators to move cantilever 102 or sample 106, or both, such that the relative motion of probe 104 and surface 108 is along the plane that is generally parallel to surface 108. For simplicity, this motion shall be termed motion in the x-y directions or along the x- or y-axes. This motion in the x-y directions facilitates the scanning of probe 104 over surface 108. As probe 104 is scanned over sample 108, actuator 110 adjusts the relative positioning of cantilever 102 and surface 108 to produce motion 202 to maintain a generally constant level of probe-sample interaction, which results in probe 104 tracking the topography of surface 108. In oscillating mode systems, the probe-sample interaction can be averaged over the oscillation cycle to produce a corresponding scalar representing the level of probe-sample interaction to be maintained as probe 104 is scanned over surface 108.

Figure 2B:
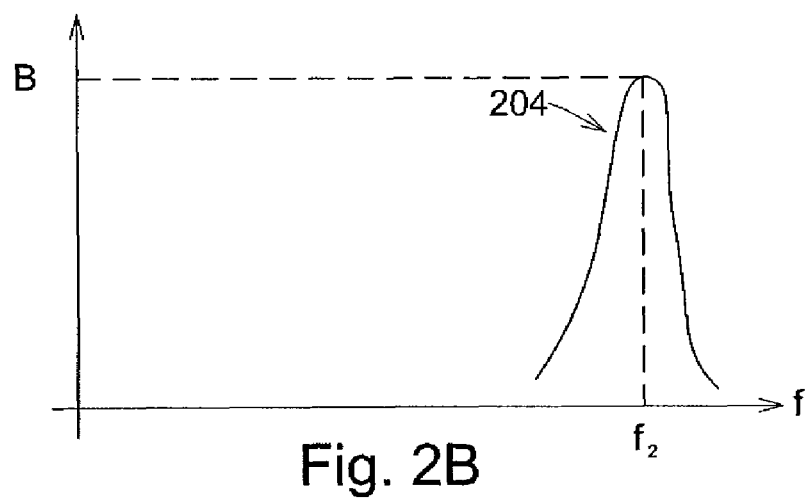

Additional mechanical systems 112 can facilitate the oscillatory motion of cantilever 102 for those embodiments that operate in oscillating mode. FIG. 2B illustrates the amplitude spectrum of oscillating motion 204 in accordance with oscillating mode. Oscillating motion 204 has an amplitude B that is substantially smaller than amplitude A. Although the oscillating motion 204 is typically in the z-direction and affects the probe-sample interaction at different points along the oscillation cycles, the oscillating motion is not generally used to track the topography of surface 108. Oscillating motion 204 has narrow bandwidth centered at a frequency $f_2$ at or near the resonant frequency of the cantilever/probe mechanism, which can be much higher than frequency $f_1$. This relatively narrow bandwidth prevents motion 204 from moving probe 104 to track the arbitrary topography of surface 108. The bandwidth of the z-axis motion includes zero hertz (i.e. DC). Amplitude A of topography-tracking motion 202 has a significantly greater displacement than the amplitude B of the oscillation motion 204. In one embodiment, for instance, topography-tracking motion 202 has a displacement of at least 1 micron. In another embodiment, motion 202 has a displacement of at least 10 microns.

Figure 2C:
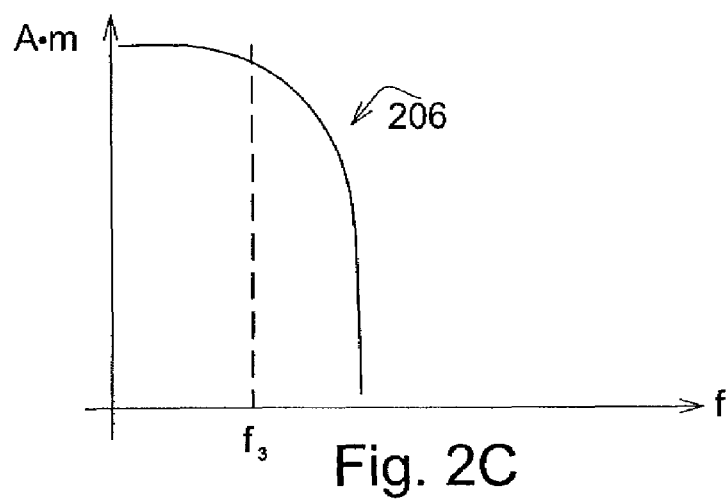

Further, additional mechanical systems 112 can include a coarse adjustment along the z axis for fast engagement and disengagement of probe 104 and surface 108. FIG. 2C illustrates the amplitude spectrum of coarse adjustment motion 206. Coarse adjustment motion 206 has a an amplitude C, which provides a significantly greater displacement than the displacement corresponding to amplitude A of topography-tracking motion 202. However, coarse motion 206 is typically limited in its resolution along the z-axis and is thus not useful for tracking the topography of surface 108 at high speed. In certain situations, such as where the topography changes beyond the range of actuator 110, the coarse z-axis adjustment provided by additional mechanical systems 112 may be used to reposition cantilever 102 or sample 106 to operate actuator 110 within its displacement range.

In a related type of embodiment, actuator 110 can be utilized to provide the oscillation mode motion 204 or the coarse z-direction motion 206. As in the embodiment described above, the oscillation motion 204 provided by actuator 110 differs from the topography-tracking motion 202 in that the oscillatory motion 204 is in response to a narrowband driving signal and has a relatively smaller displacement. The coarse z-axis motion 206 provided by actuator 110 is distinguished from the topography-tracking motion 202 in that the coarse z-axis motion 206 has a substantially limited bandwidth. Thus, the coarse z-axis motion cannot be used to track the topography of surface 108 at the higher scan rates supported by topography-tracking motion 202.

In one type of embodiment, the actuators for the x, y and z axes are piezoelectric stacks. In related embodiments, the actuators can also employ any number of alternative actuation technologies, including but not limited to, other piezoelectric devices, actuators formed from electrostrictive, magnetorstrictive, electrostatic, inductive, and/or voice coil drive mechanisms and other actuators that generate a motion in response to an input signal.

Figure 3A:
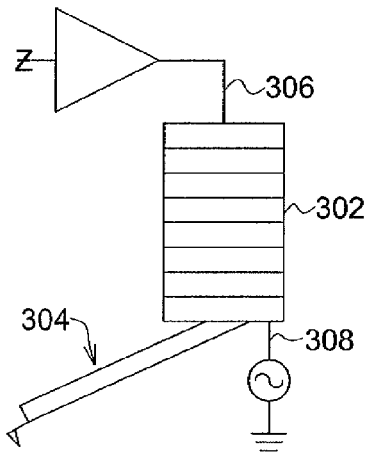
FIGS. 3A-3D are diagrams illustrating various actuator driving configurations for piezo stack actuators.
Figure 3B:
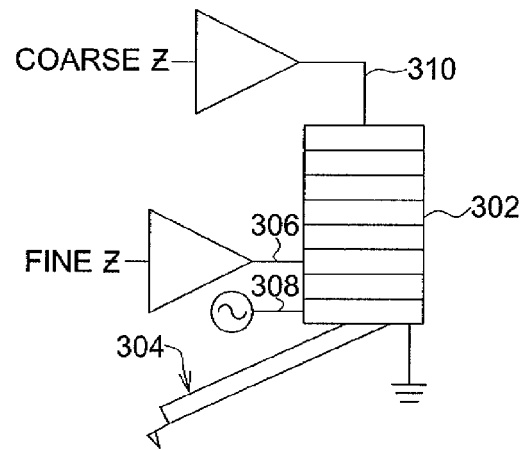
Figure 3C:
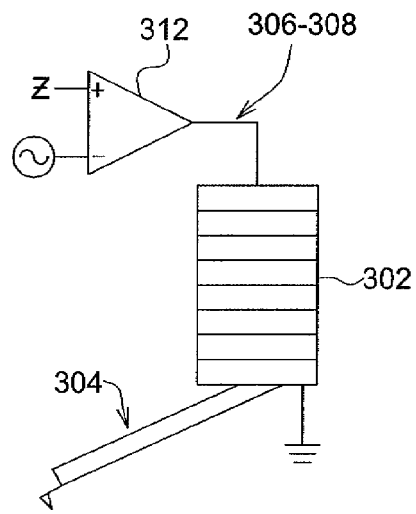
Figure 3D:
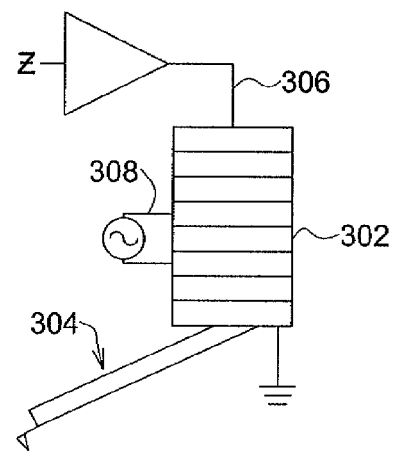

FIGS. 3A-3D illustrate various example configurations for driving a piezoelectric stack-type Z-axis actuator 302 coupled to cantilever 304 with topography-tracking signal 306, oscillation mode signal 308, and coarse z-axis adjustment signal 310 to produce, respectively, motions 202, 204, and 206. In the arrangement of FIG. 3A, topography-tracking signal 306 is applied in series with oscillation mode signal 308 to produce a superposition of these signals. In FIG. 3B, coarse z-axis adjustment signal 310 is applied to the entire piezoelectric stack 302, while topography-tracking signal 306 is applied to a smaller subset of stack 302. Oscillation mode signal 308 is applied to an even smaller portion of stack 302. Application of these signals to corresponding different numbers of piezoelectric elements provides desirable displacement scaling, resolution scaling, and loading scaling characteristics. In the embodiment of FIG. 3C, topography-tracking signal 306 and oscillation mode signal 308 are differentially amplified in driving signal amplifier 312. In the arrangement of FIG. 3D, topography-tracking signal 306 is applied in common mode with piezoelectric stack 302, while oscillation mode signal 308 is applied differentially across a certain portion of stack 302. These example configurations of FIGS. 3A-3D are merely illustrative of the availability of different driving arrangements, and should not be taken as an exhaustive presentation of the extent of possible variants.

Referring again to FIG. 1, SPM system 100 has a control system, including monitor 114 and controller 116 that controls motion 202 to track surface 108. The probe-sample interaction is monitored by monitor 114. In one embodiment, monitor 114 utilizes an optical system in which a laser and interferometer measure deflection of cantilever 102. In an oscillating mode embodiment, changes in the probe-sample interaction can be detected by observing a change in the oscillation characteristics, such as in a shift in phase offset of the oscillation due to a change in resonance characteristics from the probe-sample interaction.

Monitor 114 produces signal 115 indicating the probe-sample interaction, and feeds signal 115 to controller 116, which compares it against a setpoint signal representing an amount of probe-sample interaction to be maintained. Controller 116 produces probe positioning signal 117, which is input to analyzer 118 as a representation of the topology of surface 108. In the embodiment depicted in FIG. 1, monitor 114 and controller 116 provide a feedback control topology. In other embodiments that are also supported within the scope and spirit of the invention, other types of control topologies are possible. For example, a feed forward control system, or a model-based control system, may be utilized.

Amplifier 120 amplifies probe positioning signal 117 to produce cantilever driving signal 121. In one example embodiment, amplifier 120 is implemented with discrete and integrated electrical/electronic components on a single circuit board. In other embodiments, the circuit of amplifier 120 spans a plurality of interconnected circuit boards, or a plurality of separate interconnected enclosures. Amplifier 120 includes an internal feedback network 122 and load isolating impedance 124.

Figure 4A:
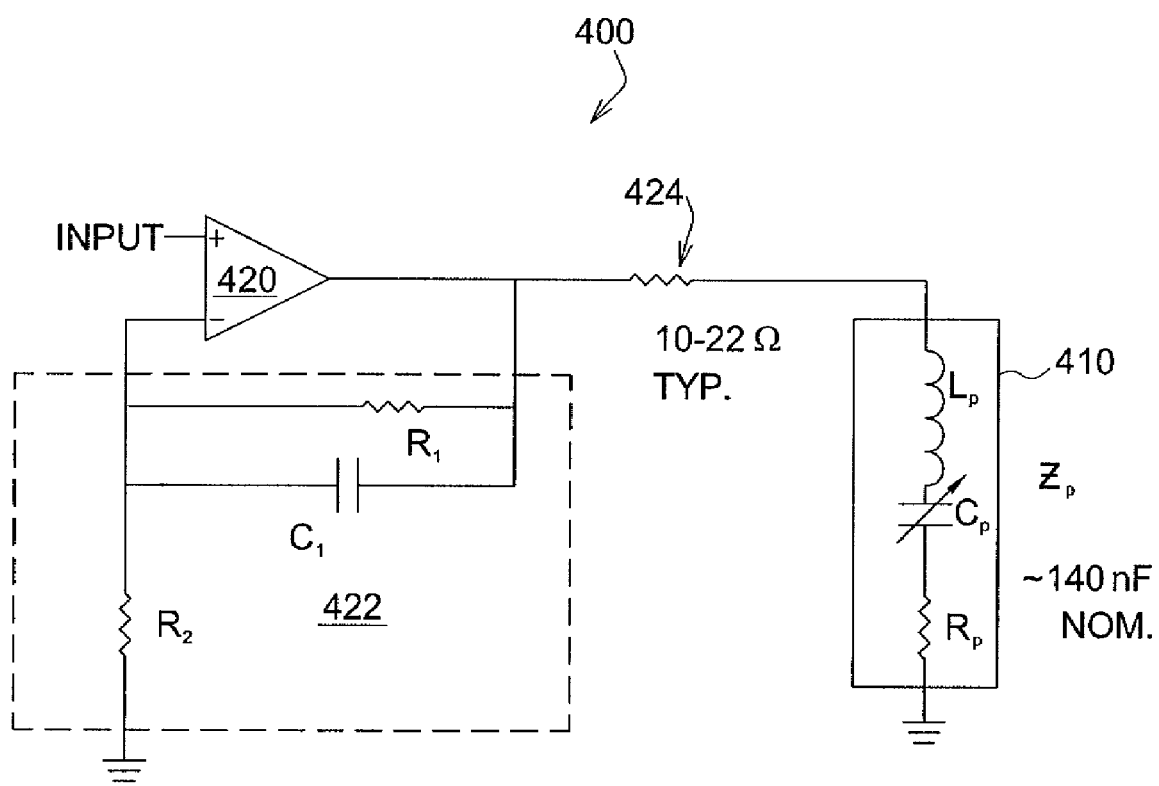
FIG. 4A is a schematic diagram illustrating an typical SPM actuator driving circuit arrangement including a modeled actuator load.

FIG. 4A is a circuit diagram illustrating a conventional SPM actuator drive amplifier circuit 400 driving piezo actuator 410. The gain of amplifier 420 is set by feedback network 422, which includes the R1-R2 voltage divider, and frequency compensation capacitor $C_1$ to increase the amplifier's feedback (thereby reducing the gain) at high frequencies to ensure stable operation. Piezo actuator 410 has an impedance $Z_p$ represented as having a variable (frequency-dependent) capacitance $C_p$ with a nominal value of approximately 140 nF. Parasitic resistance $R_p$ and parasitic inductance $L_p$ are also present, with the inductance $L_p$ becoming more prominent at higher frequencies. Piezo actuators typically have one or multiple frequencies of resonance, and may present a back force, or reverse power, to the amplifier circuit. The variable loading characteristics of the piezo actuator 410 have the potential to make amplifier 420 unstable. For instance, a transient event may drive amplifier 420 into an uncontrolled oscillation. Load isolation resistor 424, typically having a value of between 10 and 22 ohms for a piezo load such as piezo load $Z_p$, further stabilizes amplifier 420.

Unfortunately, compensation capacitor $C_1$, and load isolation resistor 424 in combination with the reactive load $Z_p$ of piezo actuator 410, each introduce a pole into the overall transfer function of system 100, causing loss of bandwidth as a result of the phase offset introduced, particularly at high frequencies. FIGS. 4B and 4C illustrate the amplitude and phase spectra of conventional piezo drive amplifier circuits driving a 140 nF piezo stack. The amplitude rolls off at between 100 and 200 kHz, and the phase shift exceeds 100 degrees at around 200 kHz.

Figure 5A:
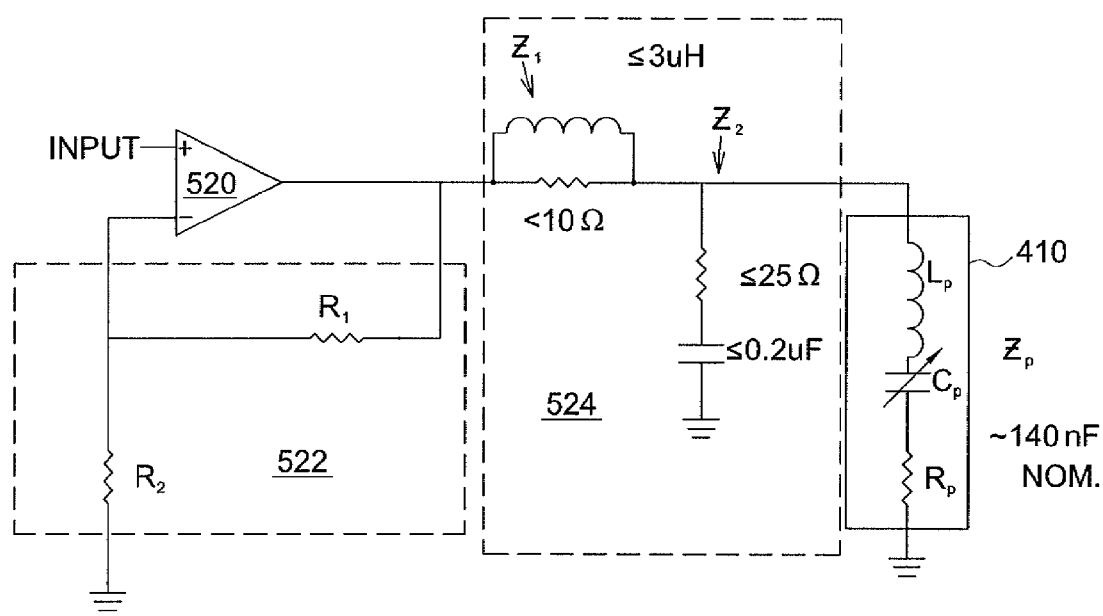
FIG. 5A is a schematic diagram of a SPM actuator driving amplifier according to one embodiment of the invention configured to drive the actuator load modeled in FIG. 4A.
Figure 6:
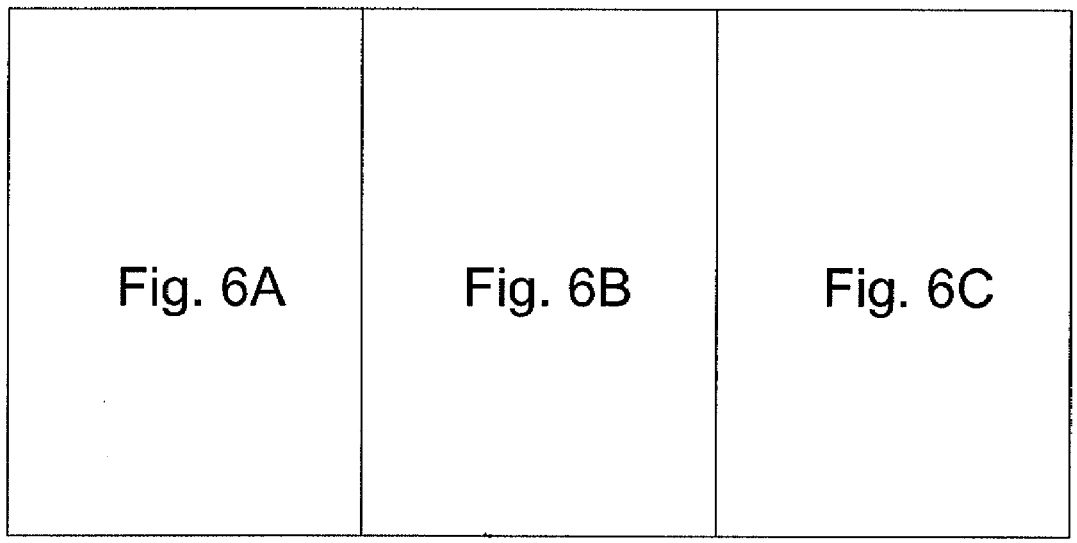
FIGS. 6 and 6A-6C are a functional block diagram of an example actuator driving amplifier according to one embodiment of the present invention.
Figure 6A:
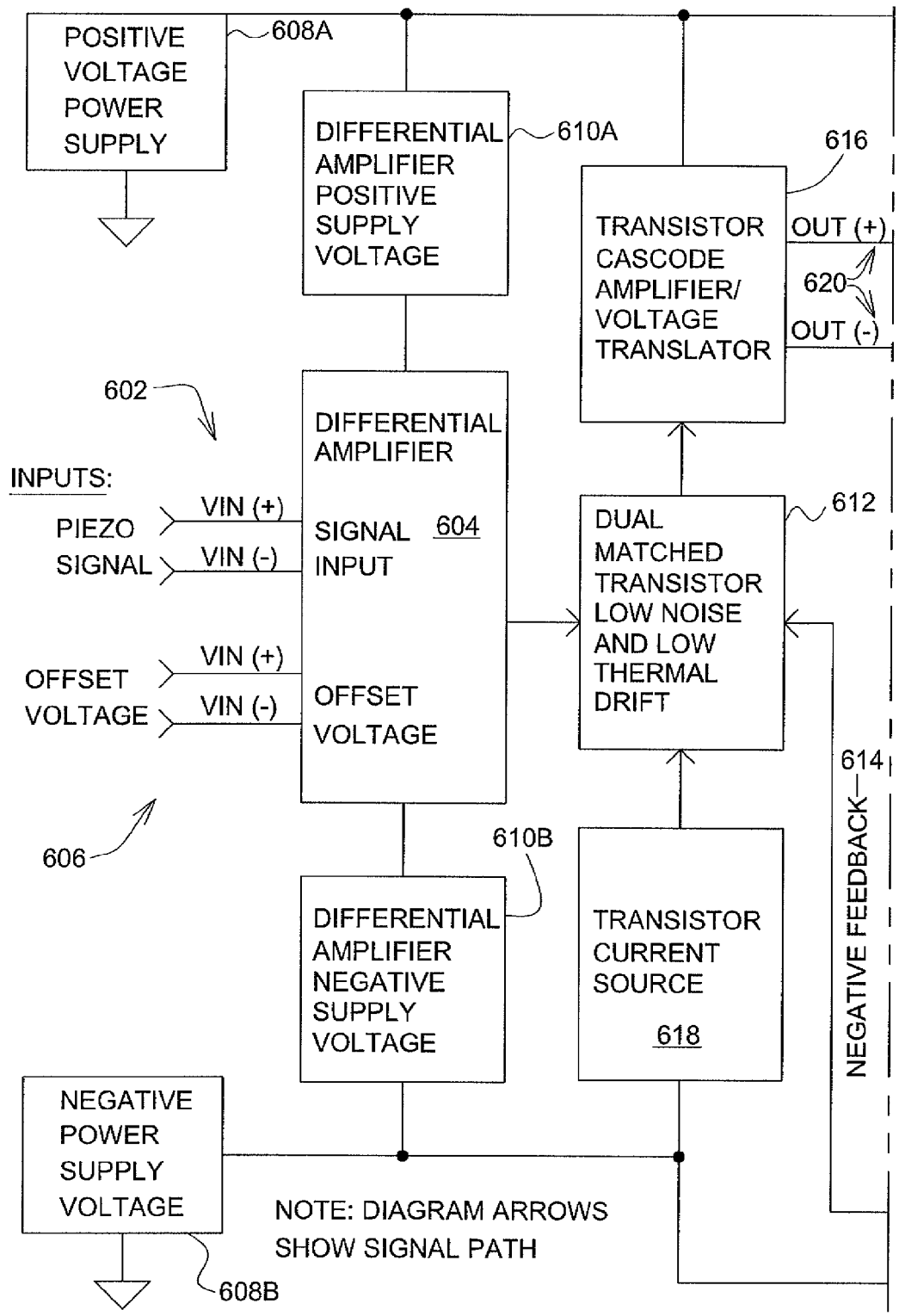
Figure 6B:
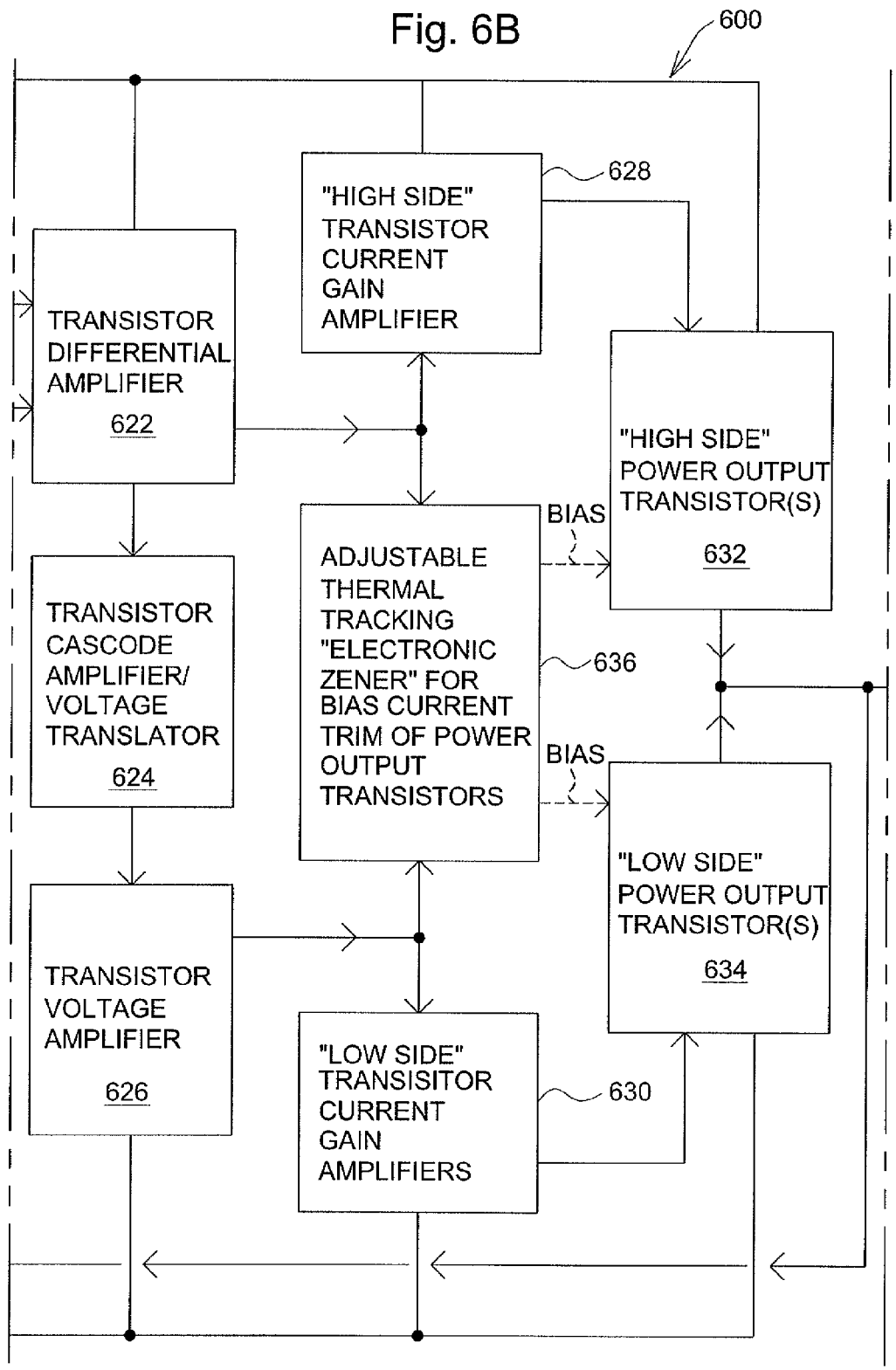
Figure 6C:
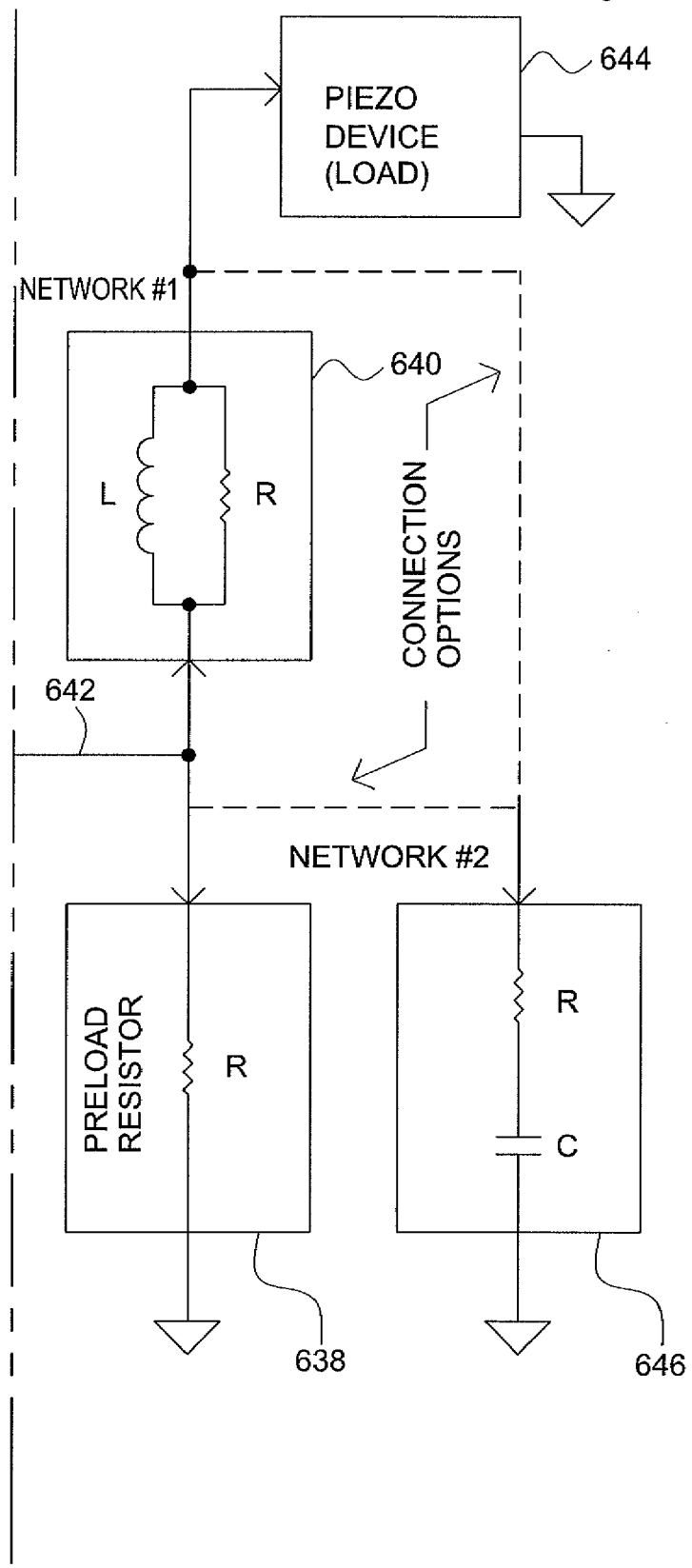

FIG. 5A illustrates a SPM actuator drive amplifier circuit according to one embodiment of the invention. Amplifier 520 drives piezo stack 410 as described above. However, notably, internal feedback network 522 has only the R1-R2 resistor divider, and omits any compensation capacitor. This substantially non-reactive feedback arrangement (in which any reactance, if present, is negligible in the operation of the amplifier circuit in the SPM within its operating bandwidth) permits more gain and less phase lag compared to the circuit of FIG. 4A. Additionally, the substantially non-reactive feedback does not interact with the summing junction of the feedback network, further improving stability of the amplifier.

Load isolation network 524 has substantially lower impedance than load isolating resistor 424. In the embodiment depicted in FIG. 5A, a series impedance network $Z_1$ includes a resistor of less than 10 ohms in parallel with an inductor of less than 3 µH. In one embodiment, the resistor is non-inductive, and capable of handling 10-12 watts. In related embodiments, the resistor's value is 5 ohms or less, or 2 ohms or less. The inductor can be made with #16 or #18 gauge enamel insulated, solid copper wire having 20-30 turns wound around the tubular body of the resistor. In this embodiment, the series resistance of the inductor does not exceed 0.1 ohm. In a related embodiment, the inductor is a separate component independent of the resistor. Impedance network $Z_1$ presents a negligible resistance at low frequencies, and is frequency-dependent, not to exceed the value of the resistor.

In one type of embodiment, a second impedance network $Z_2$ is placed in parallel with the piezo actuator load 410. Impedance network $Z_2$ includes a series R-C network in which the resistor does not exceed 25 ohms and the capacitor is 0.2 µF or less. These values are selected based on the frequency-dependent loading characteristics of piezo impedance $Z_p$. For instance, at higher frequencies, where piezo impedance $Z_p$ appears inductive and presents like an open circuit, second impedance network $Z_2$ increases its effect on loading amplifier 520. The overall loading of amplifier 520 is therefore more evenly distributed over the operating bandwidth. In some instances, impedance network $Z_2$ operates as a power factor correction for restoring the power factor in situations when the piezo impedance $Z_p$ becomes inductive.

FIGS. 5B-5C are amplitude and phase spectra illustrating the performance achieved by a working prototype having a basic topology as described above with reference to FIG. 5A. The amplitude spectrum of FIG. 5B has a rolloff frequency of beyond 300 kHz, providing an improvement over the gain of the conventional circuit of FIG. 4A by a factor of 5-6. The phase spectrum of FIG. 5C indicates a phase lag of only around 20 degrees at 100 kHz, 40 degrees at 200 kHz, and 60 degrees at 300 kHz.

The bandwidth represented by the amplitude and phase spectra of FIGS. 5B-5C corresponds to the small signal performance of SPM actuator drive amplifier circuit of FIG. 5A driving a Z-axis actuator (in this case, piezoelectric stack actuator 410 having a nominal capacitance of 140 nF). The small signal performance in this instance includes the magnitude and phase response of the amplifier circuit while operating in the small signal regime of the amplifier. The amplifier operates in its small signal regime when it outputs a signal having an amplitude that is not limited by the amplifier circuit's slew rate or current drive capability. The frequency of the amplifier circuit's frequency response at which the output signal's amplitude is 3 dB below the output signal's amplitude at DC (zero Hertz) corresponds to the amplifier circuit's small signal bandwidth.

Amplifier 520 can drive piezo stack 410 to produce coarse Z-axis motion such as motion 206. In this condition, amplifier 520 provides an output having a bandwidth that is smaller than the small signal bandwidth. In this operating mode, the amplifier circuit's bandwidth is limited by its slew rate. The amplifier slew rate is dependent on the type and operating range of the actuator being is driven by the amplifier and the shape of the waveform. For example, in one embodiment, amplifier 520 drives a piezo stack 410 that has an operating range of 3 um. With a 100 V maximum applied voltage, and a triangle drive waveform, the amplifier 520 has a slew rate of at least 17 kV/sec. In one embodiment, amplifier 520 has a slew rate of at least 33 kV/sec.

FIGS. 6 and 6A-6C are diagrams illustrating various functional blocks of exemplary actuator driving amplifier 600 according to certain embodiments of the invention. Differential input signal 602, such as probe positioning signal 117 described above with reference to FIG. 1, is applied to differential front-end amplifier 604. In one embodiment differential front-end amplifier 604 is implemented as an operational amplifier. In another embodiment, differential amplifier 604 is implemented with discrete electronic components. In a related embodiment, differential front-end amplifier 604 supports a separate input offset voltage adjustment 606. In the embodiment depicted, differential front-end amplifier 604 receives power from positive and negative supplies 608a and 608b, respectively. In another type of embodiment, only a positive supply 608a is utilized, such that actuator driving amplifier 600 is unipolar. In the example embodiment depicted, the supply voltage to differential front-end amplifier 604 is reduced from the positive and negative supply voltages 608a and 608b by respective step-down converters 610a and 610b.

Differential front-end amplifier 604 feeds a second stage differential amplifier 612. In one example embodiment, second stage differential amplifier 612 includes a matched pair of transistors. Negative feedback network 614 provides the feedback signal to second stage differential amplifier 612. In one type of embodiment, where second stage differential amplifier 612 cannot withstand the full voltage supply of positive supply 608a-negative supply 608b, transistor cascode amplifier 616 facilitates voltage translation. Transistor current source 618 provides biasing for the second amplification stage.

The second amplification stage produces a differential output 620 that is fed to a third amplification stage that includes third stage differential amplifier 622, transistor cascode amplifier 624, and transistor voltage amplifier 626. Third stage differential amplifier 622 feeds high-side transistor current gain amplifier 628; whereas transistor voltage amplifier 626 feeds low-side transistor current gain amplifier 630. Transistor cascode amplifier 624 provides voltage translation functionality for those embodiments in which amplifiers 622 and 626 are unable to withstand the supply voltage.

High-side transistor current gain amplifier feeds high-side power output transistor stage 632, and low-side transistor current gain amplifier feeds low-side power output transistor stage 634. High-side power output transistor stage 632 and low-side power output transistor stage 634 are arranged in a push-pull fashion. In various embodiments, the output stage can be configured to operate in class B or class AB modes. In various embodiments, there can be different numbers of output transistors at the power output stage. For instance, in one embodiment, each side 632 and 634 has two power output transistors. In another embodiment, each side has five transistors. The number of transistors can be selected without substantial change to the schematic of the remainder of the amplifier circuit as needed to satisfy the current drive requirements of associated SPM applications.

Third stage amplifiers 622 and 626 also feed thermal tracking circuit 636. Thermal tracking circuit 636 dynamically adjusts biasing of power output transistors 632 and 634 to manage thermal runaway-conditions. In one embodiment, thermal tracking circuit 636 receives heat transfer from the output power transistors, and adjusts the biasing current accordingly. In one type of embodiment, power transistors with integrated thermal tracking functionality, such as, for example, ThermalTrack™ transistors marketed by On Semiconductor. In these embodiments, thermal tracking circuit 636 interfaces with the temperature sensing port of the ThermalTrack™ devices and adjusts the biasing based on its interaction with the thermal tracking components.

In one embodiment, preload resistor 638 is utilized to help stabilize the output of the amplifier circuit 600 under no load conditions. Load isolation impedance 640 is placed in series with amplifier output node 642 and actuator 644, which can be a piezo stack or other suitable transducer as described above. Reactive loading network 646, placed either at output node 642, or across actuator 644, provides a stabilization function as described above with reference to FIG. 5A.

Figure 7:
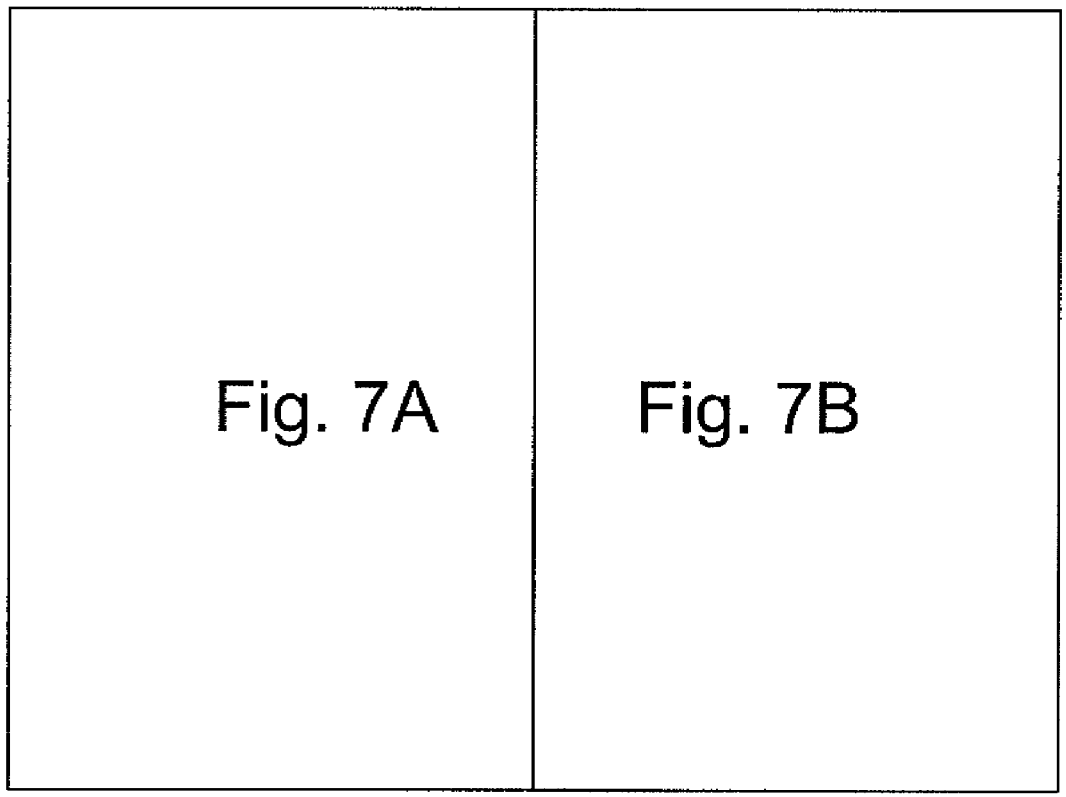
Figure 7A:
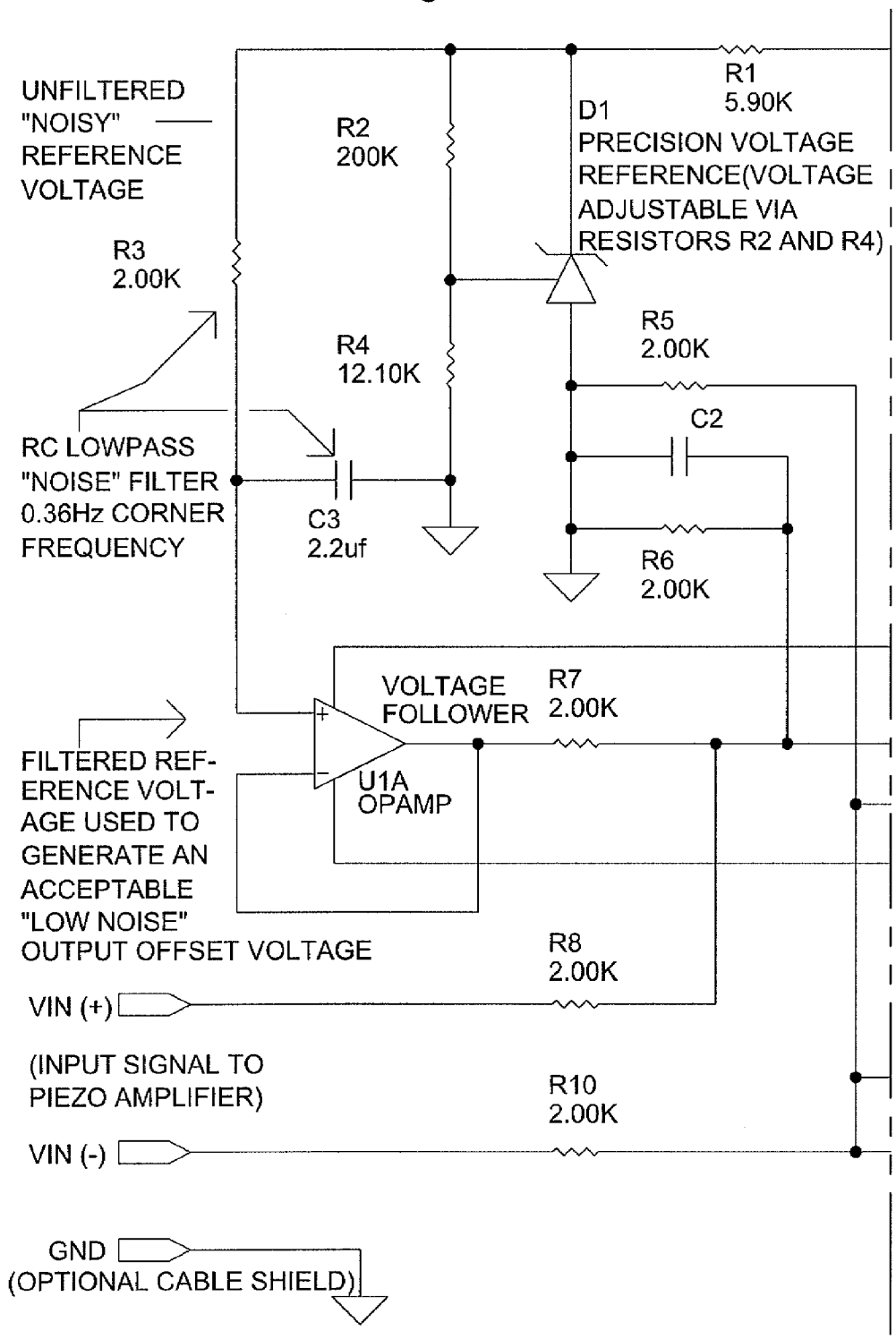
Figure 7B:
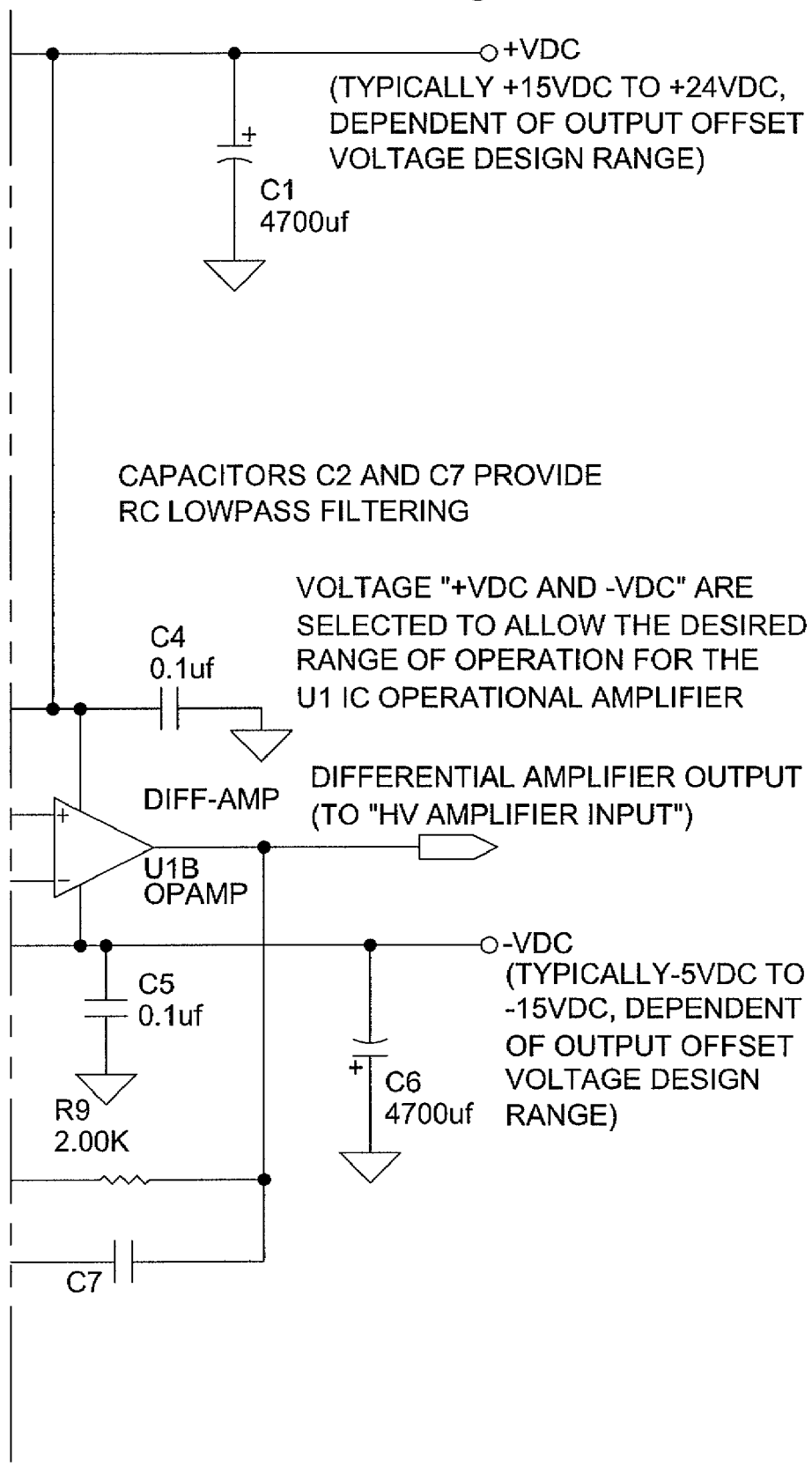
Figure 8A:
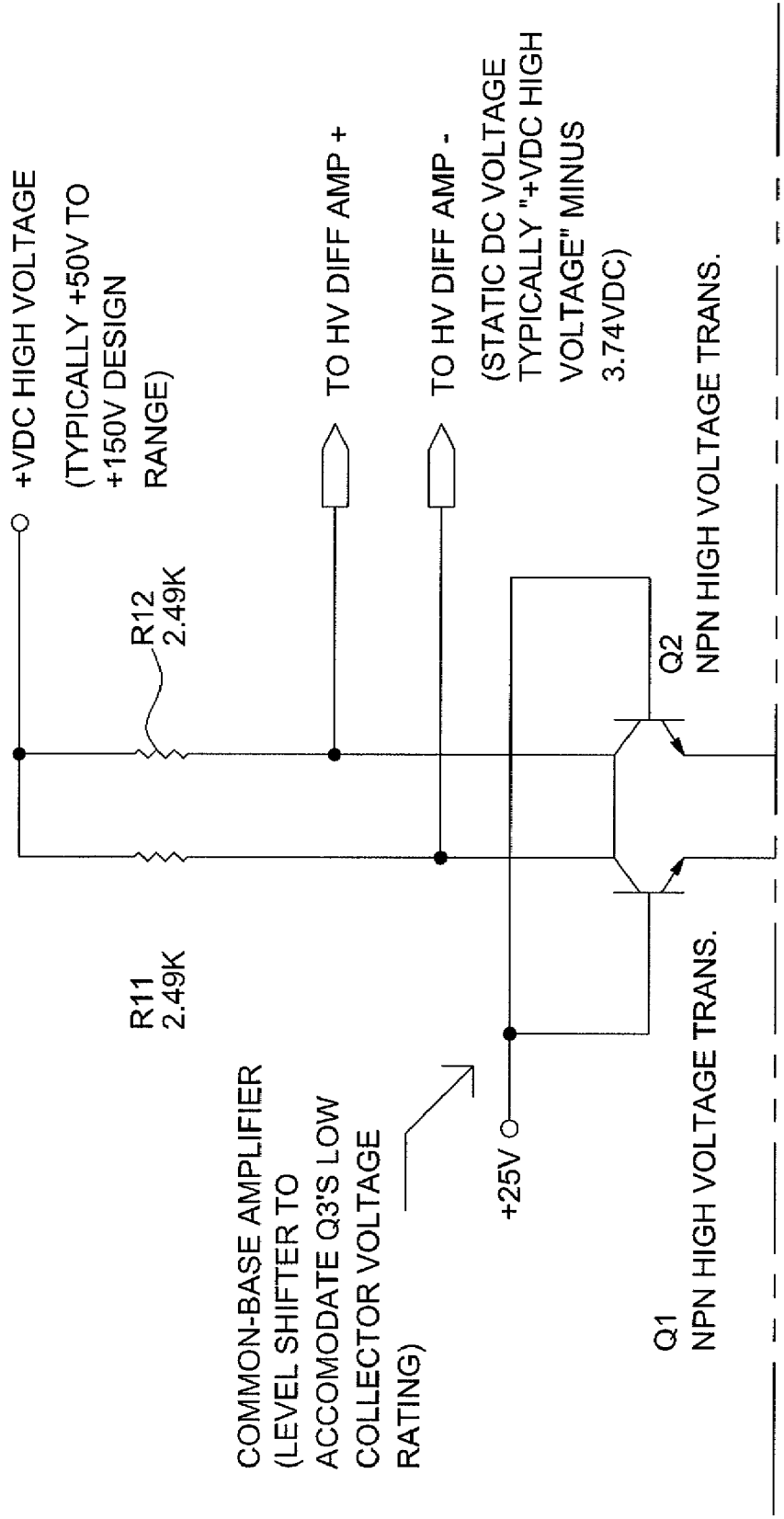
Figure 8B:
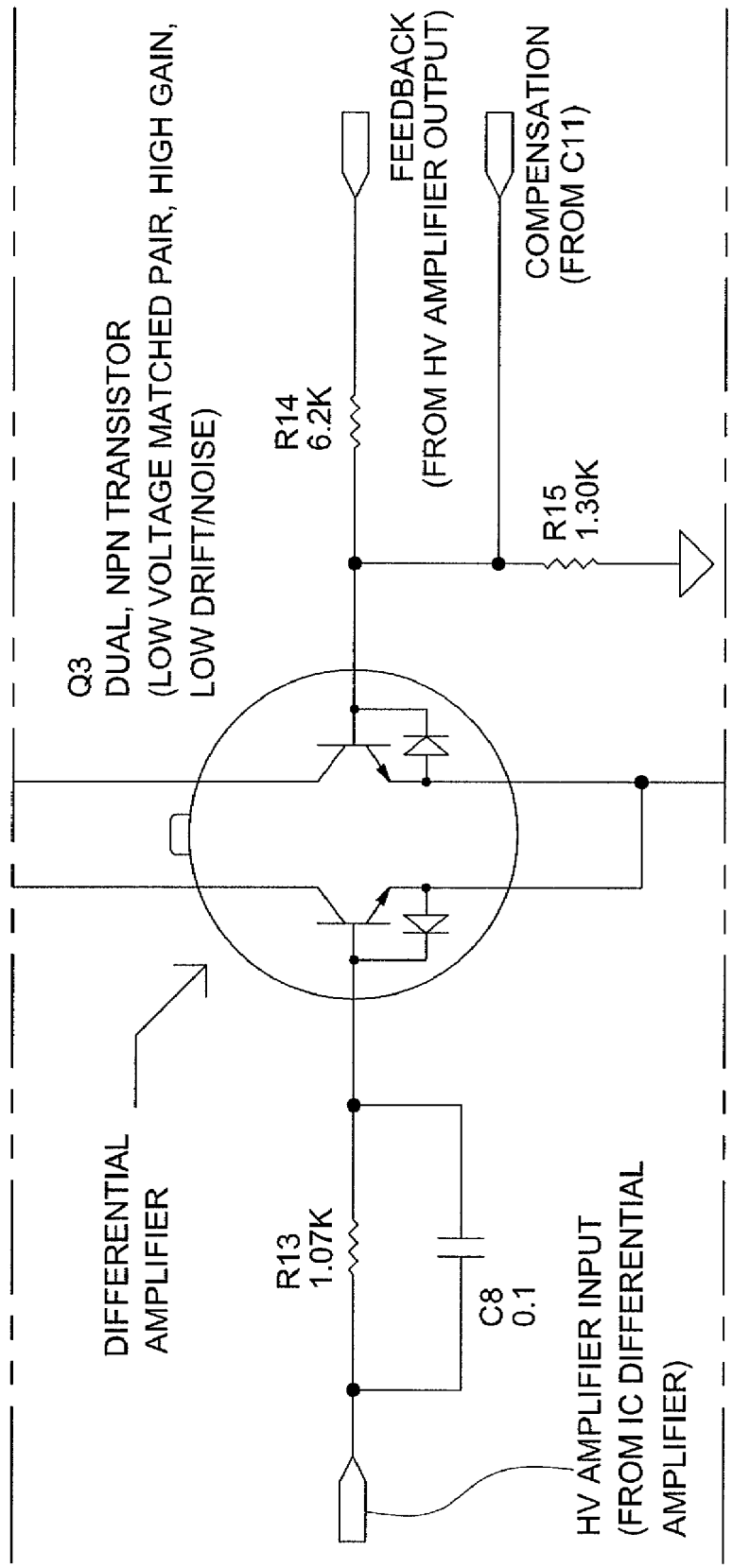
Figure 8C:
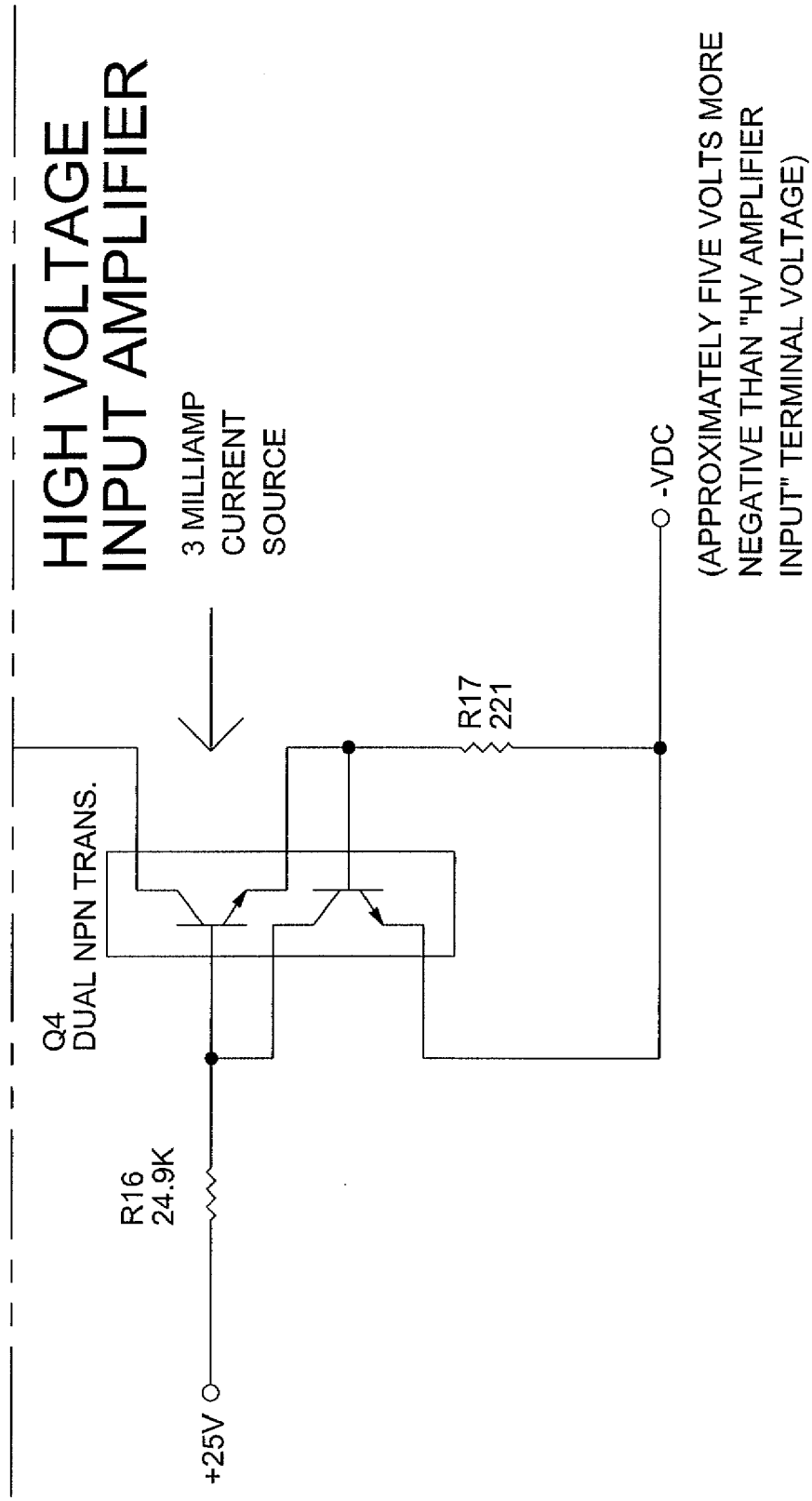
Figure 9A:
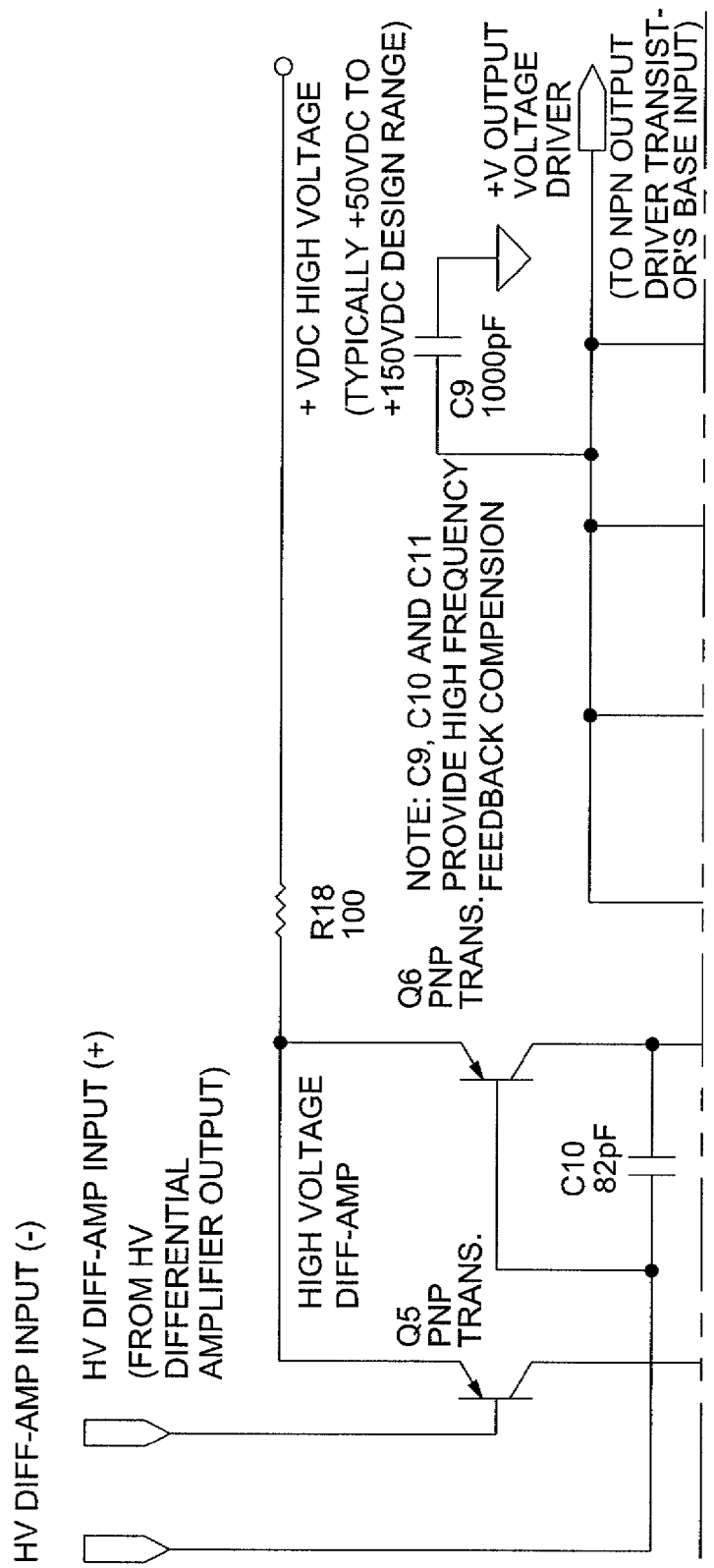
Figure 9B:
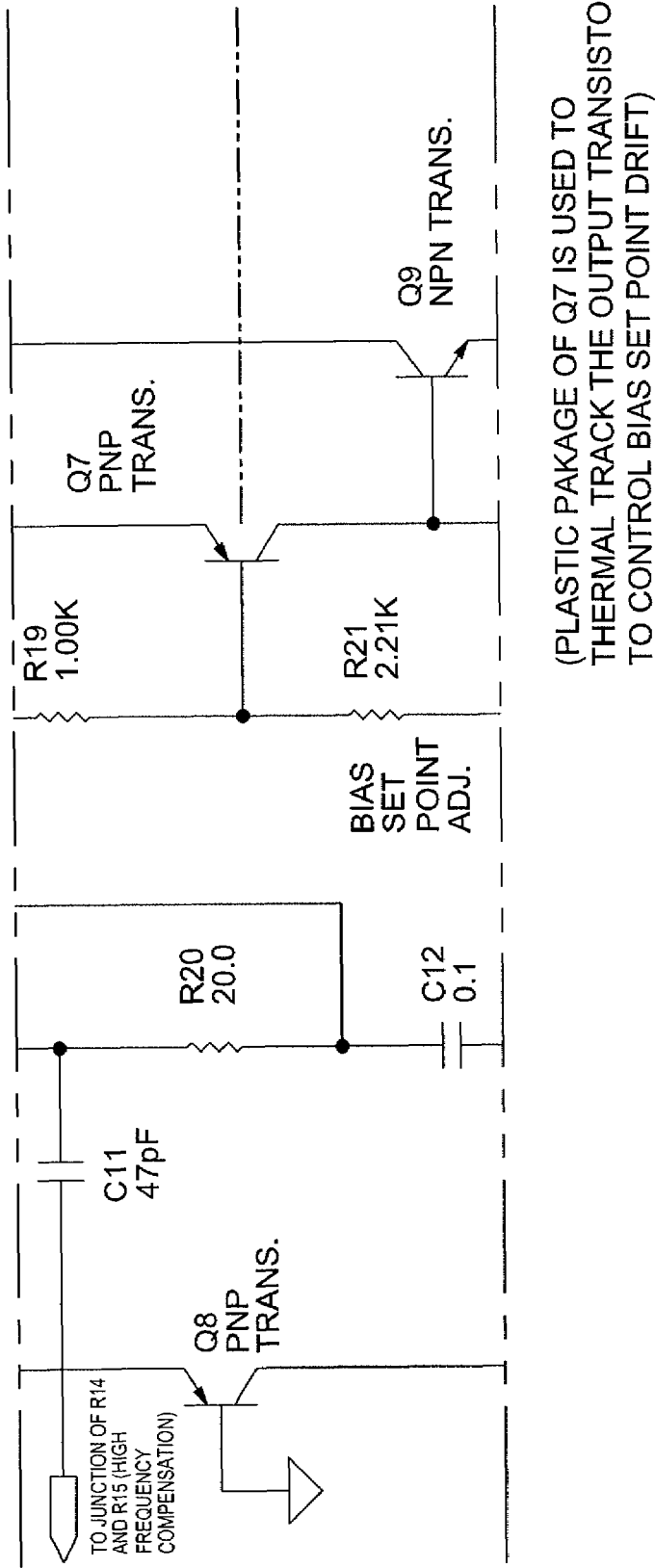
Figure 10A:
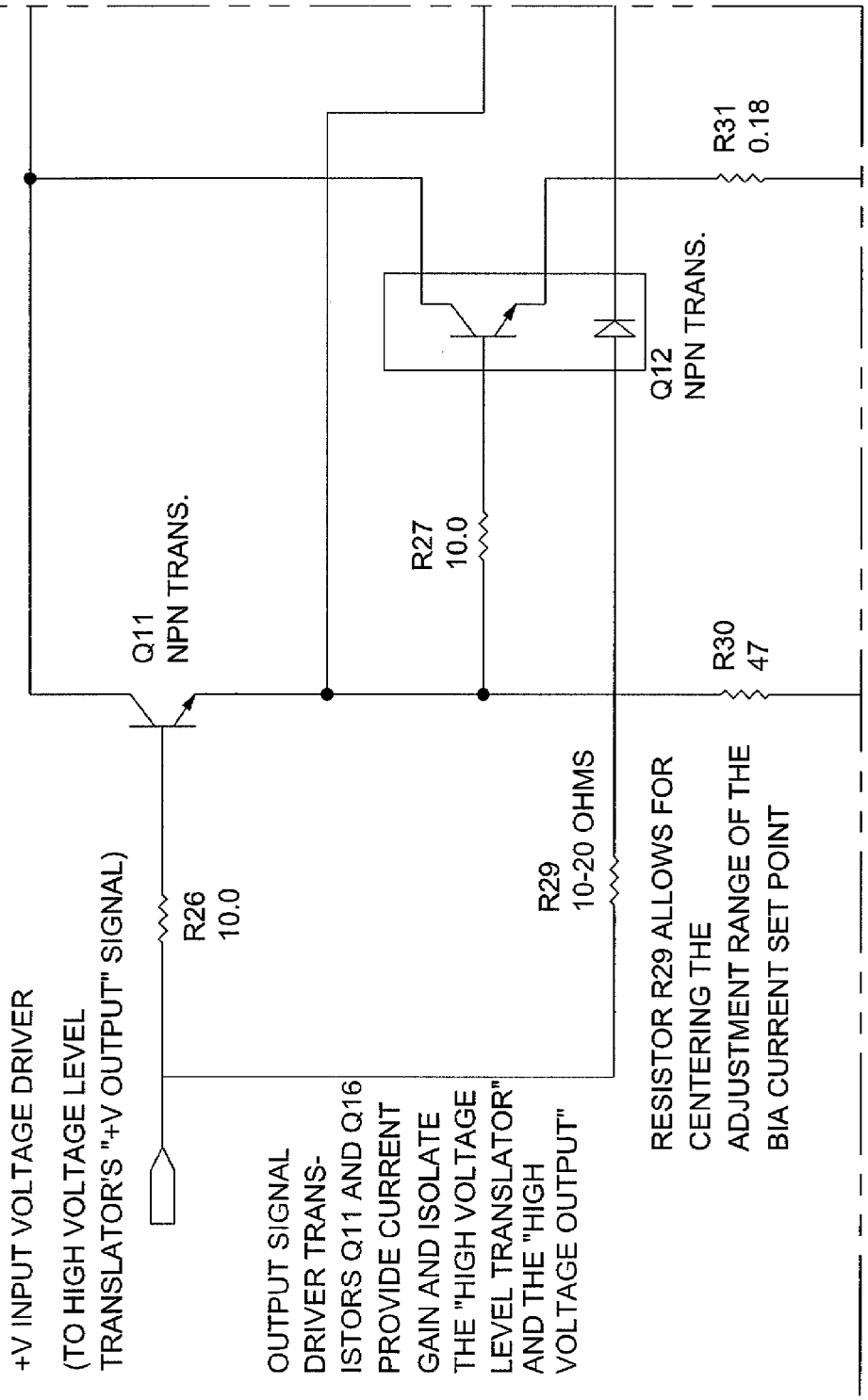
Figure 10B:
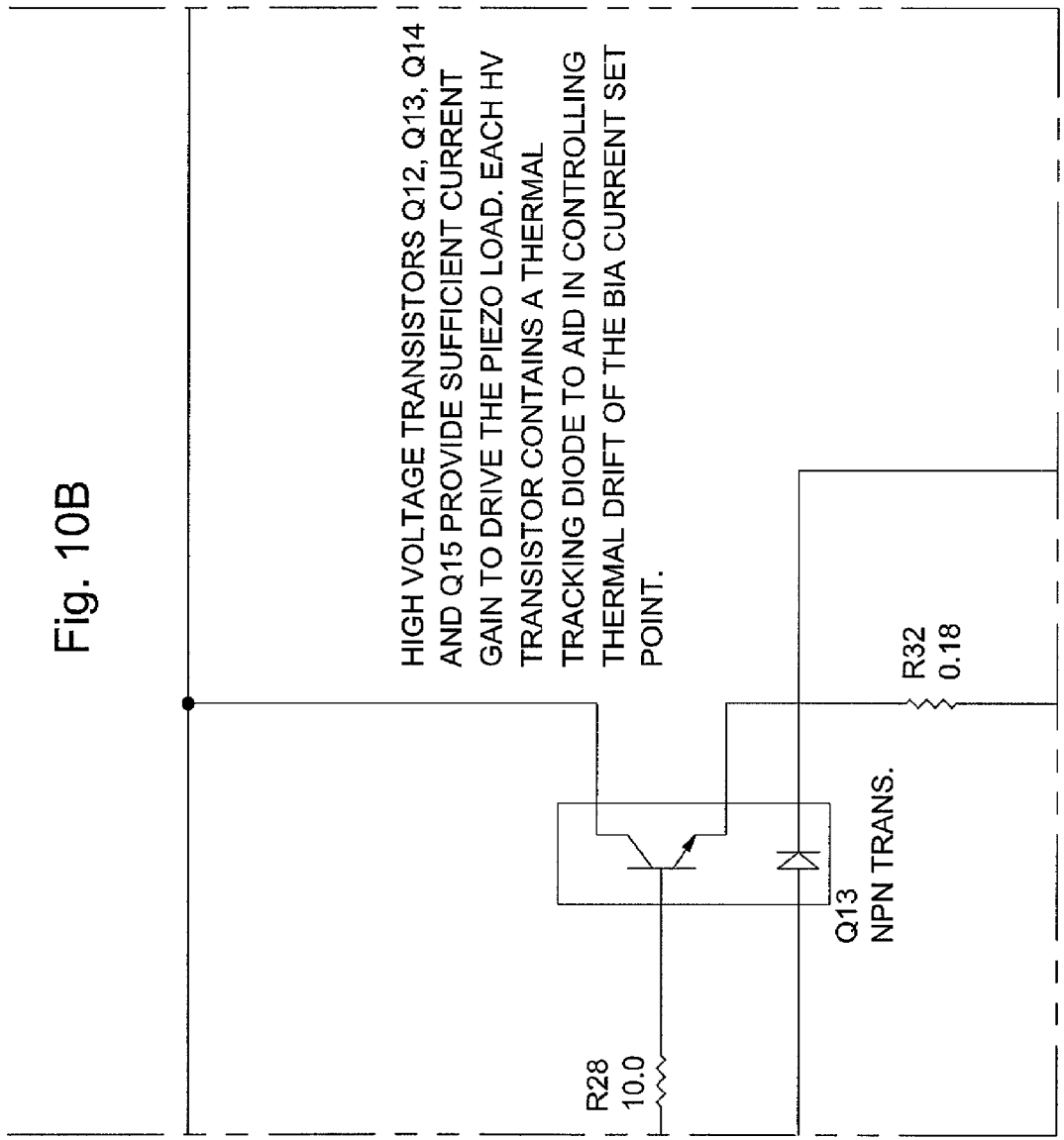
Figure 10C:
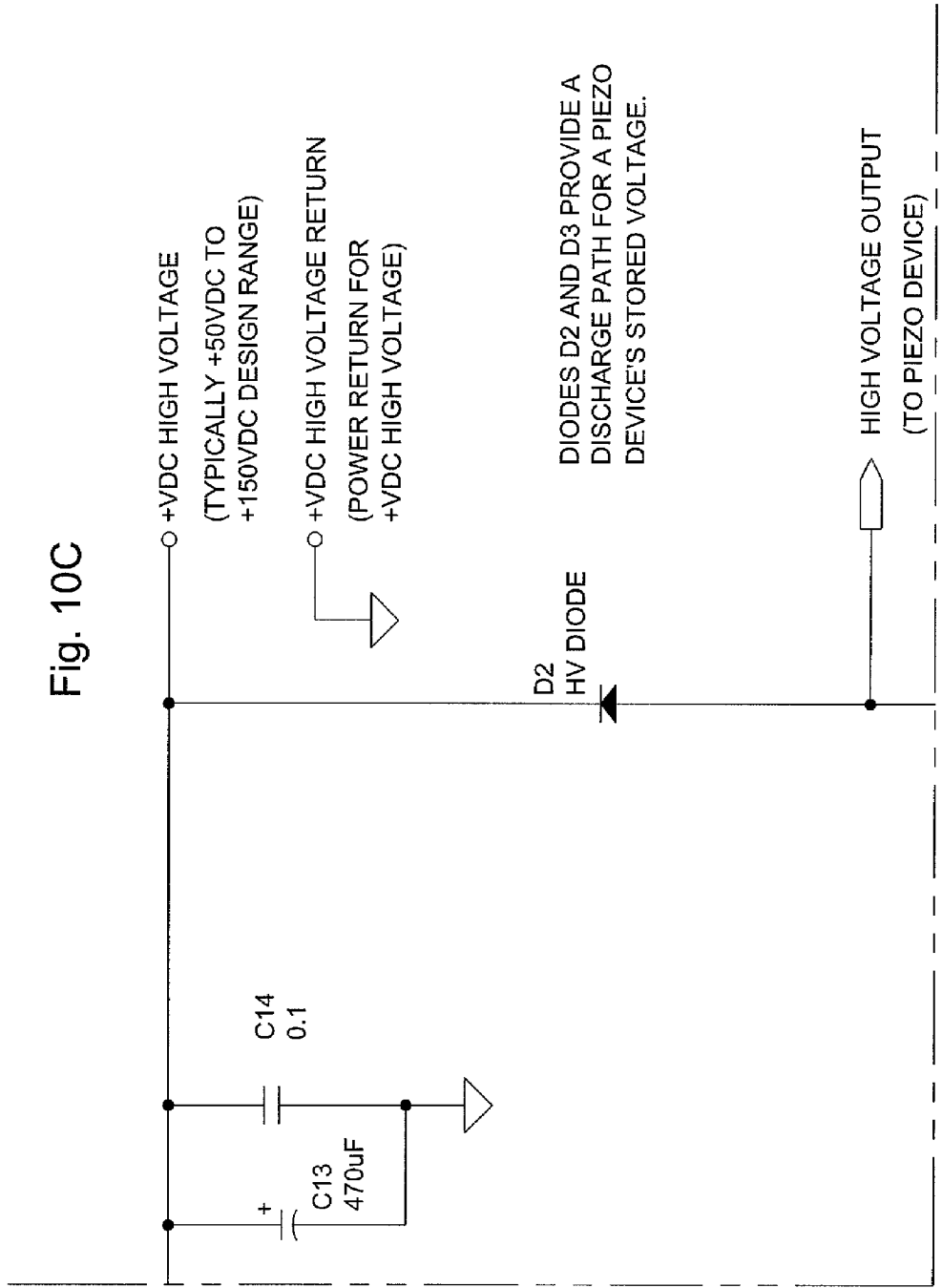
Figure 10D:
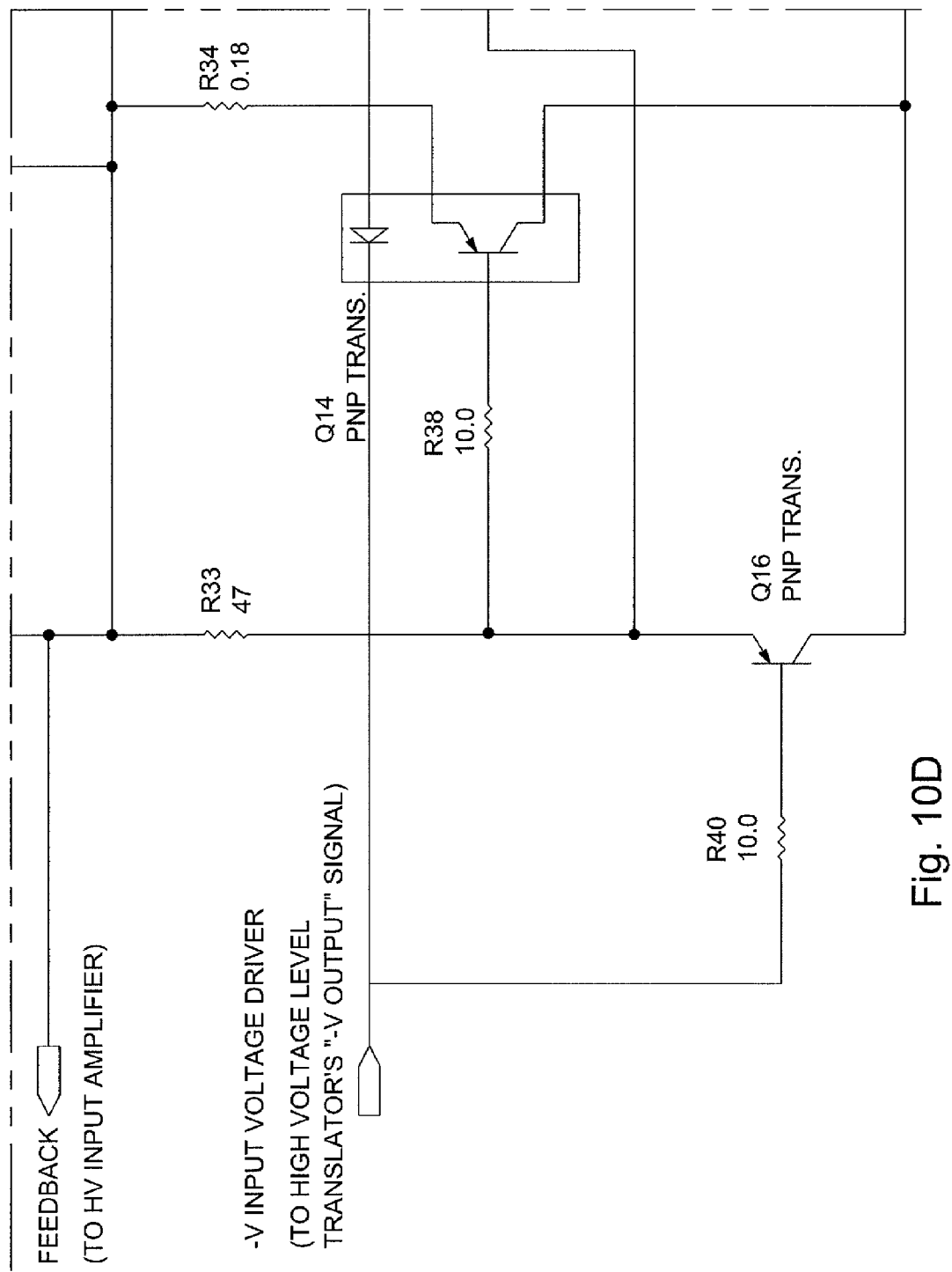
Figure 10E:
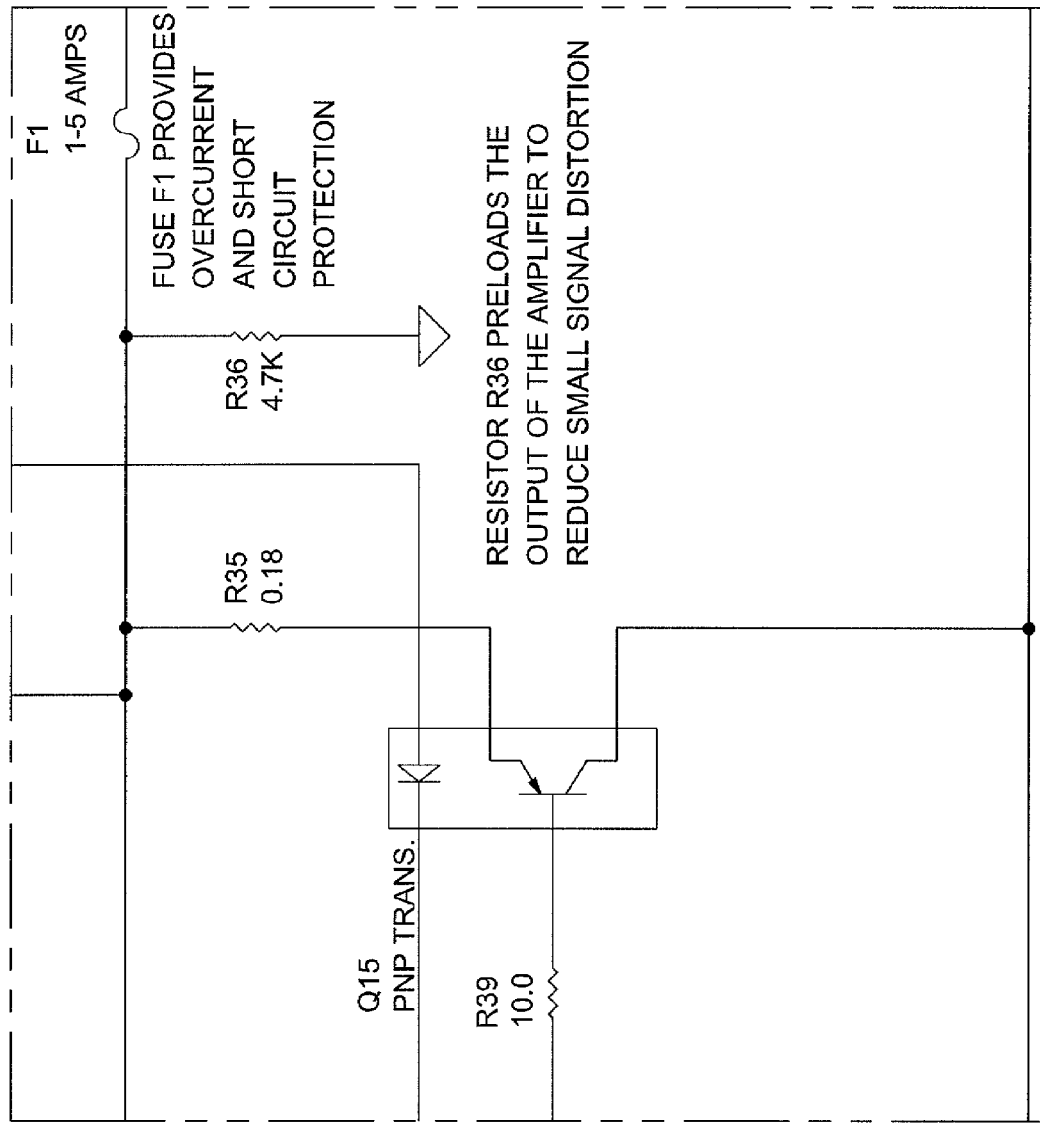
Figure 10F:
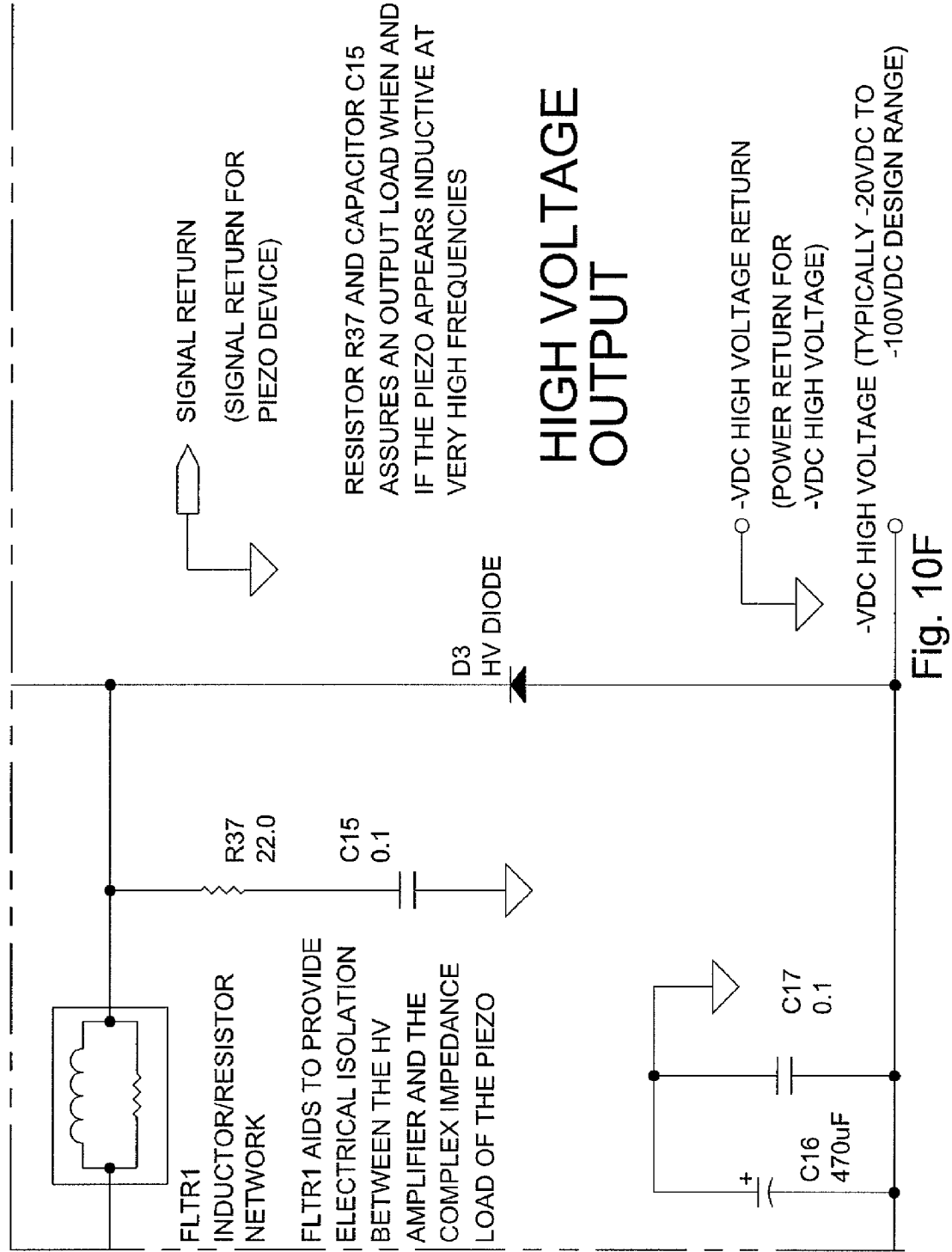
Figure 11:
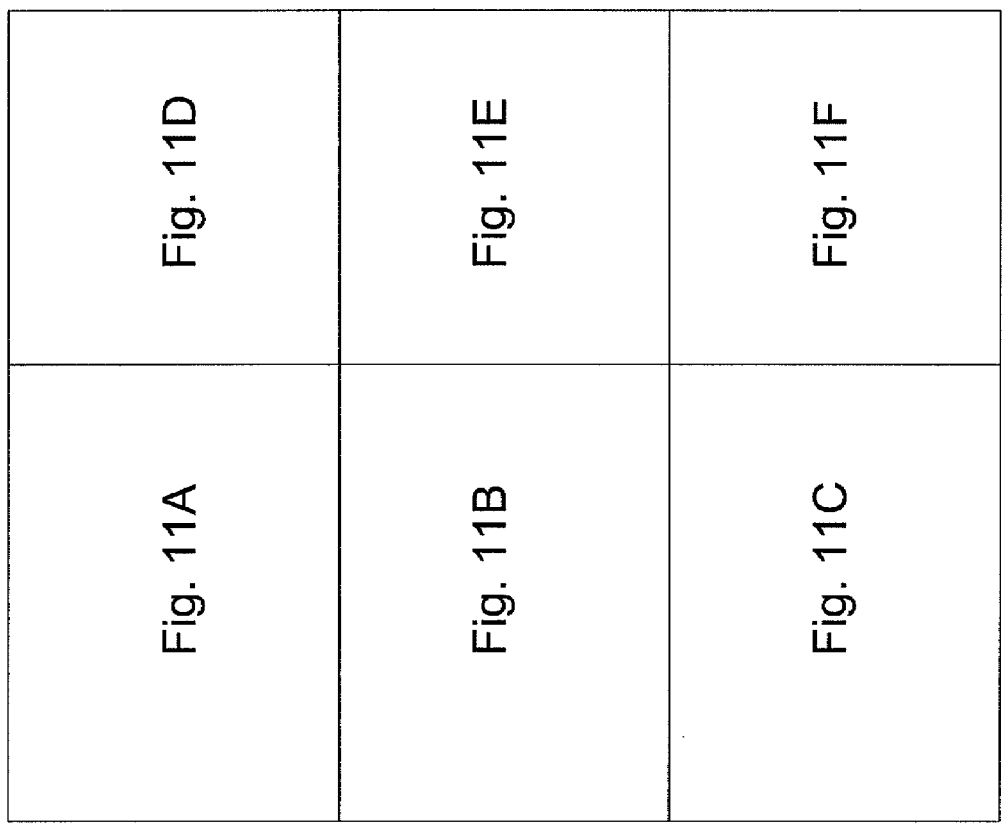
Figure 11A:
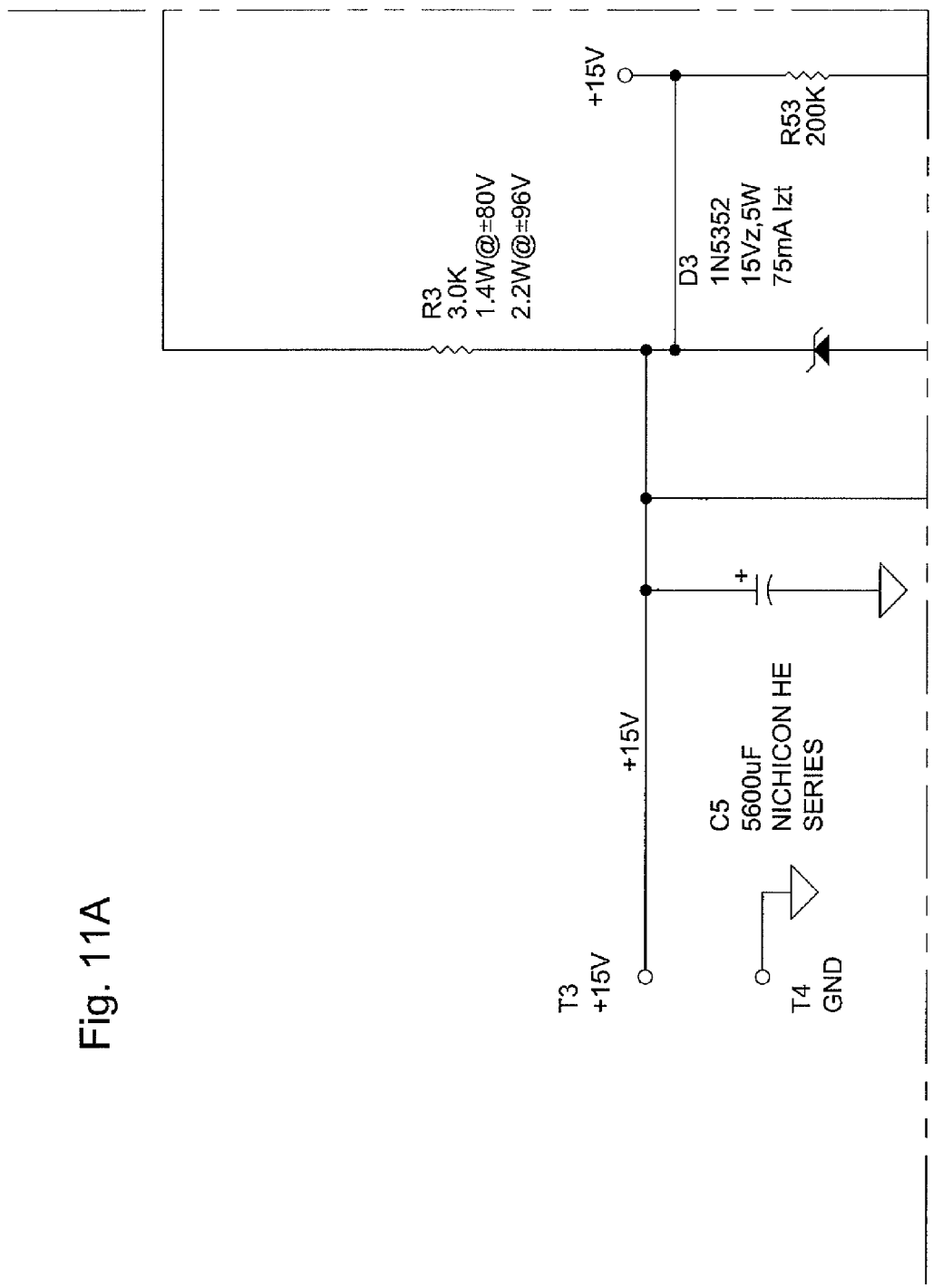
Figure 11B:
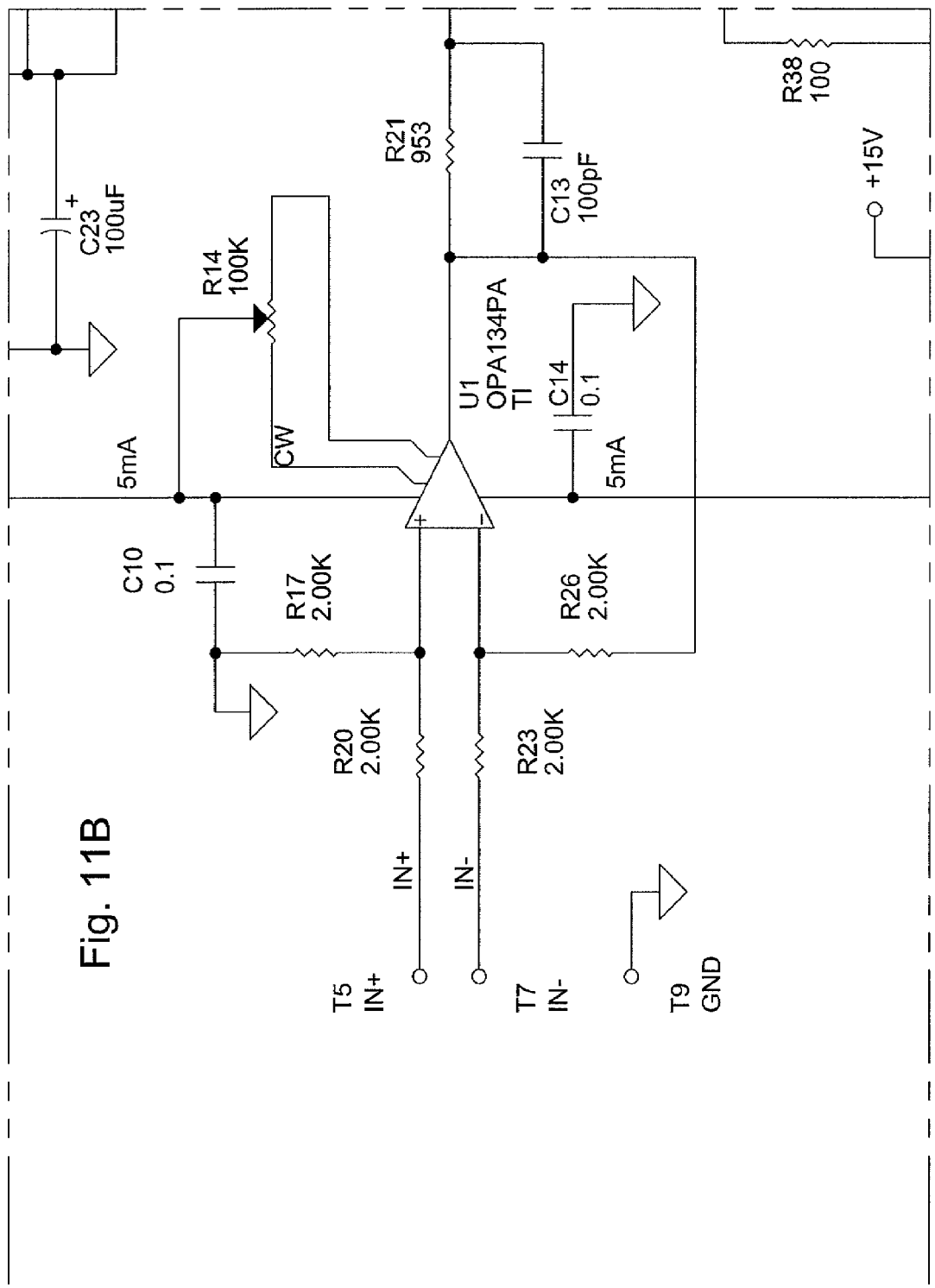
Figure 11C:
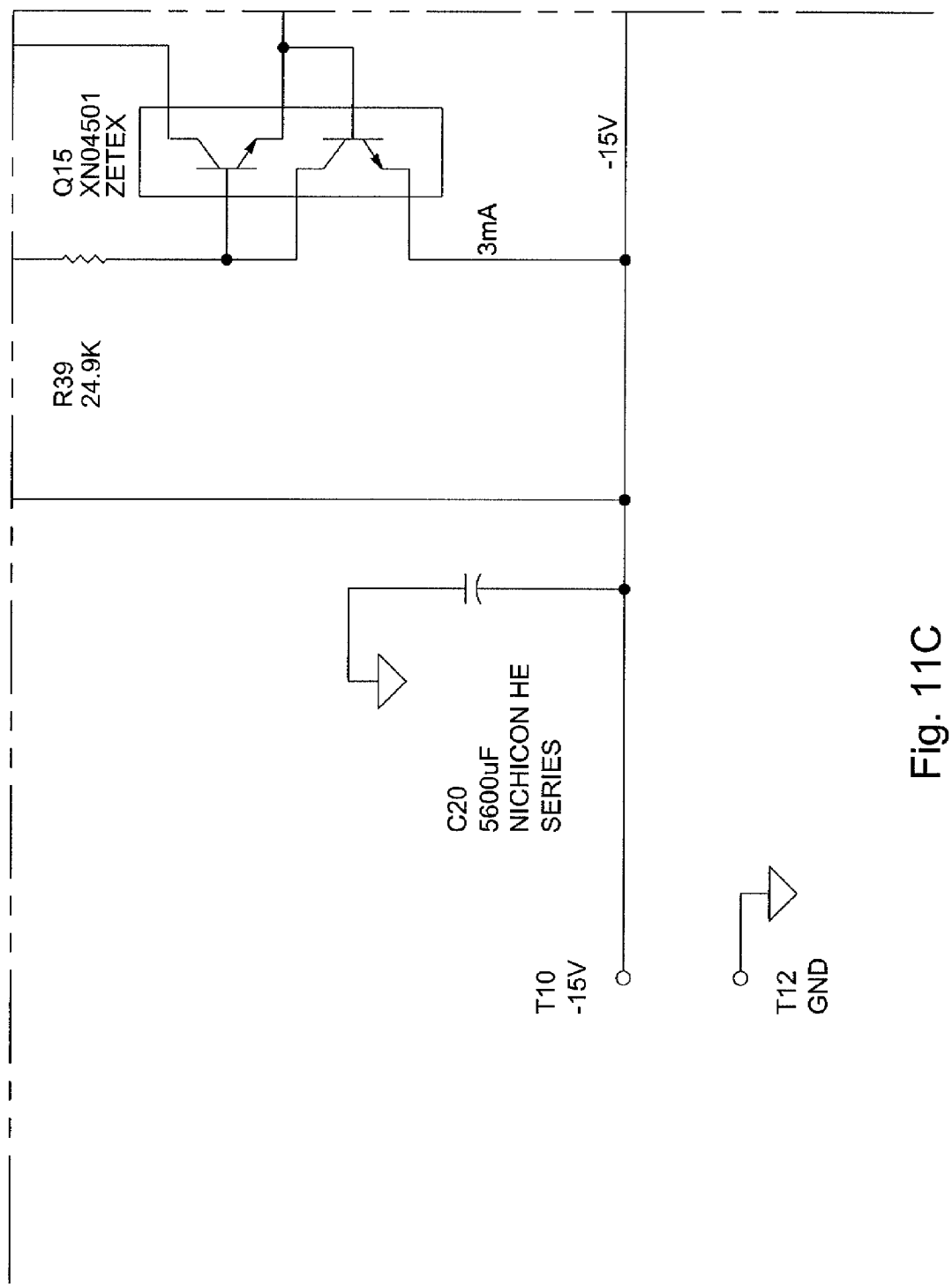
Figure 11D:
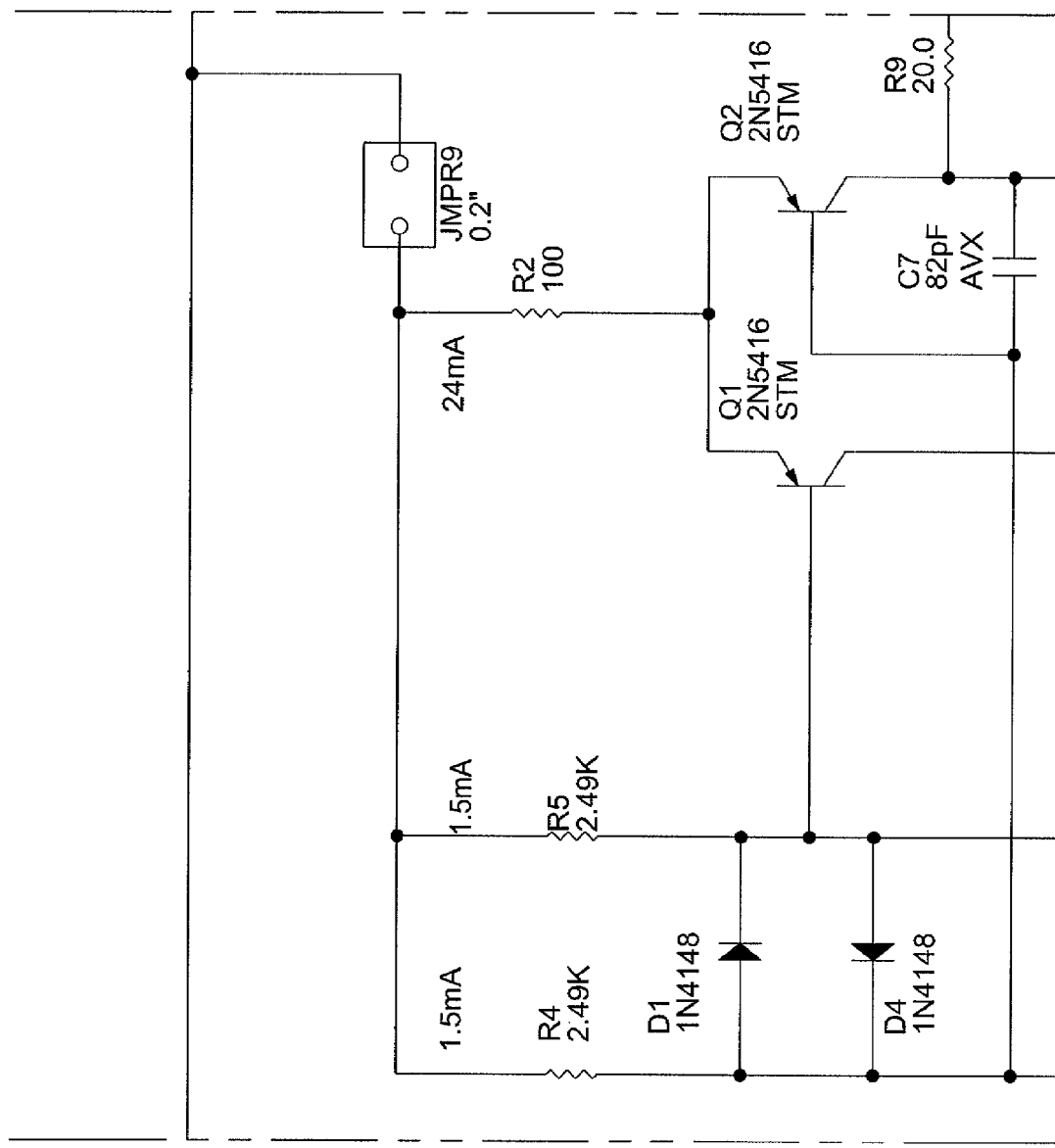
Figure 11E:
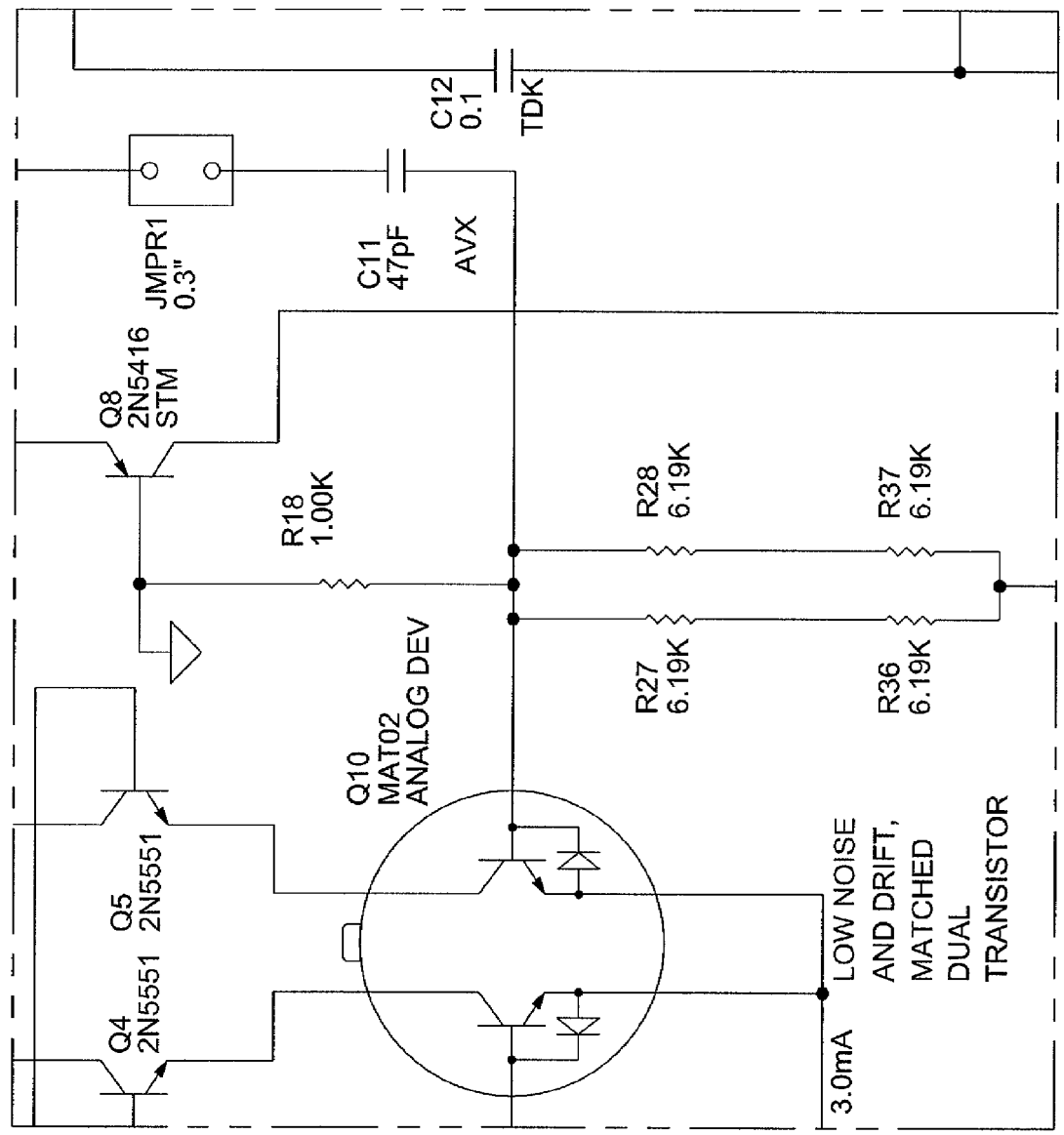
Figure 11F:
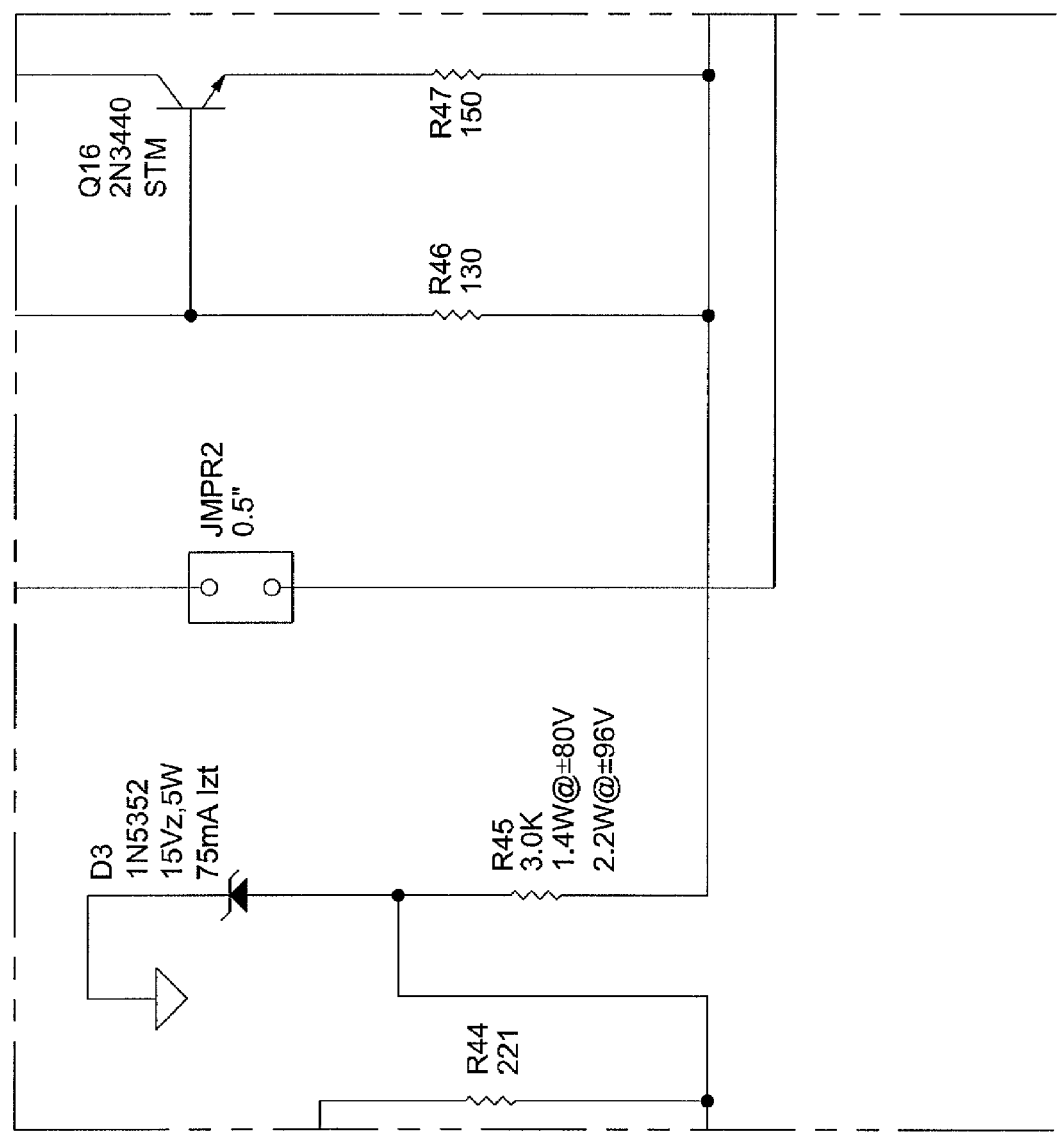
Figure 12A:
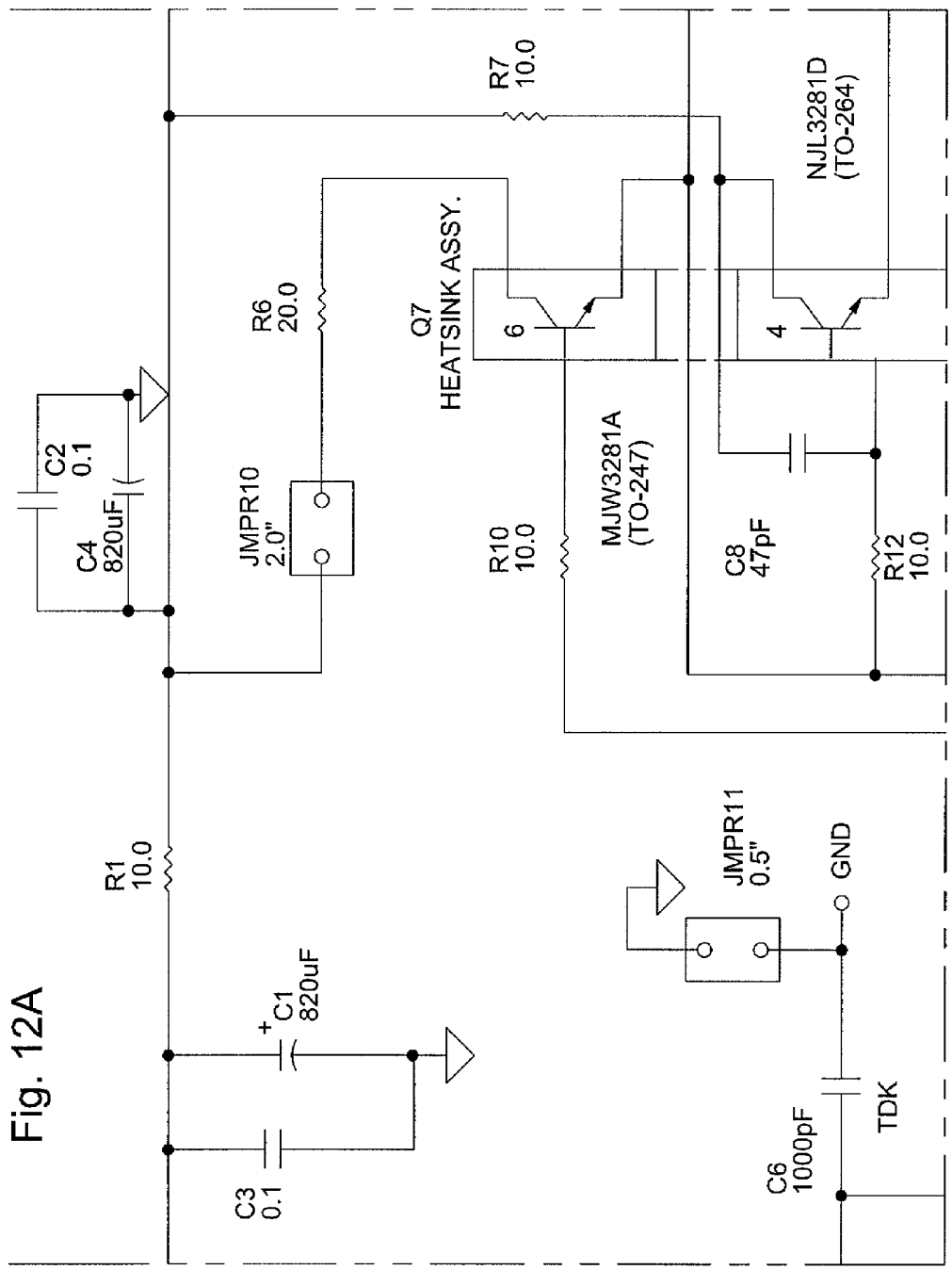
Figure 12B:
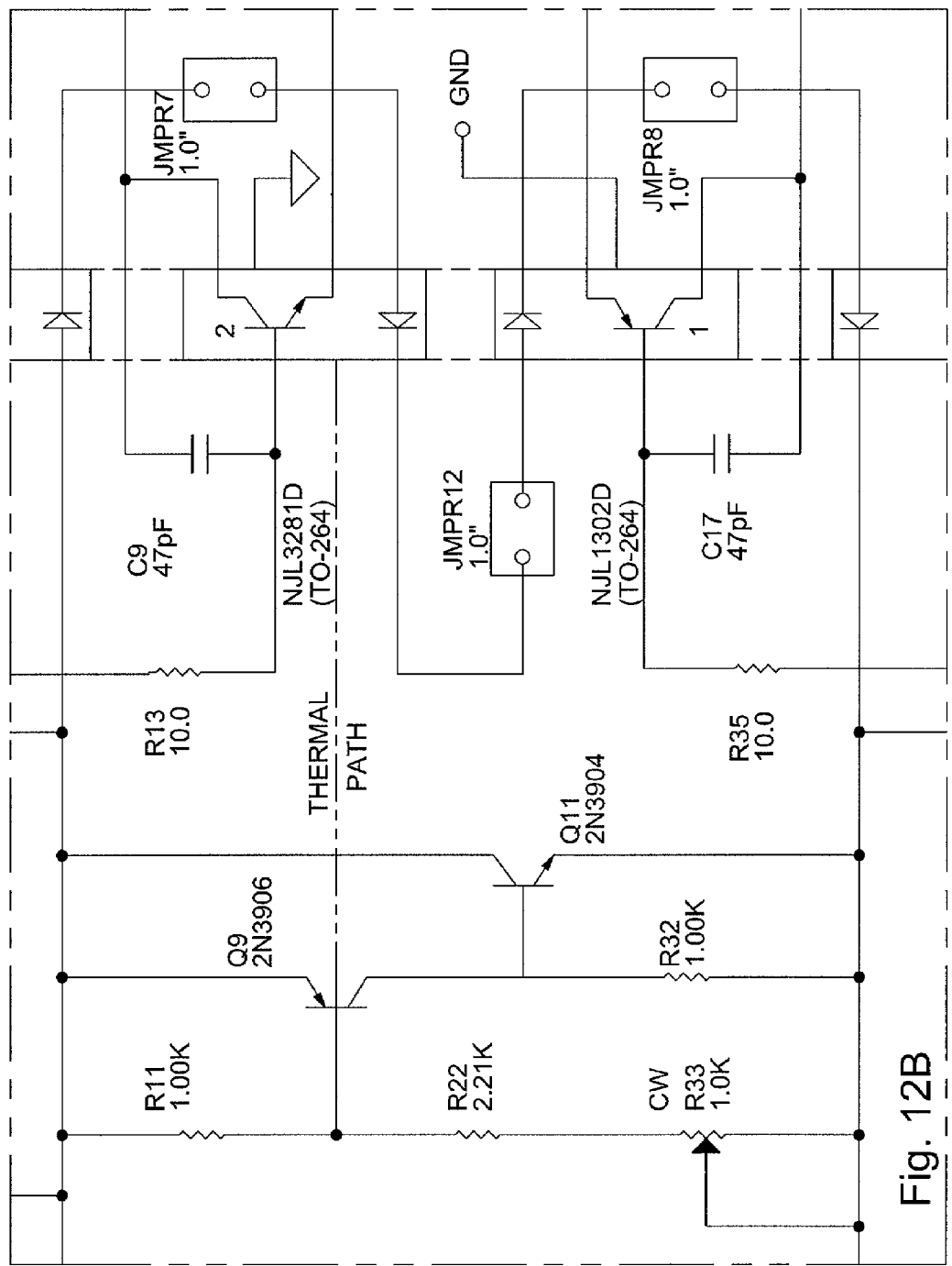
Figure 12C:
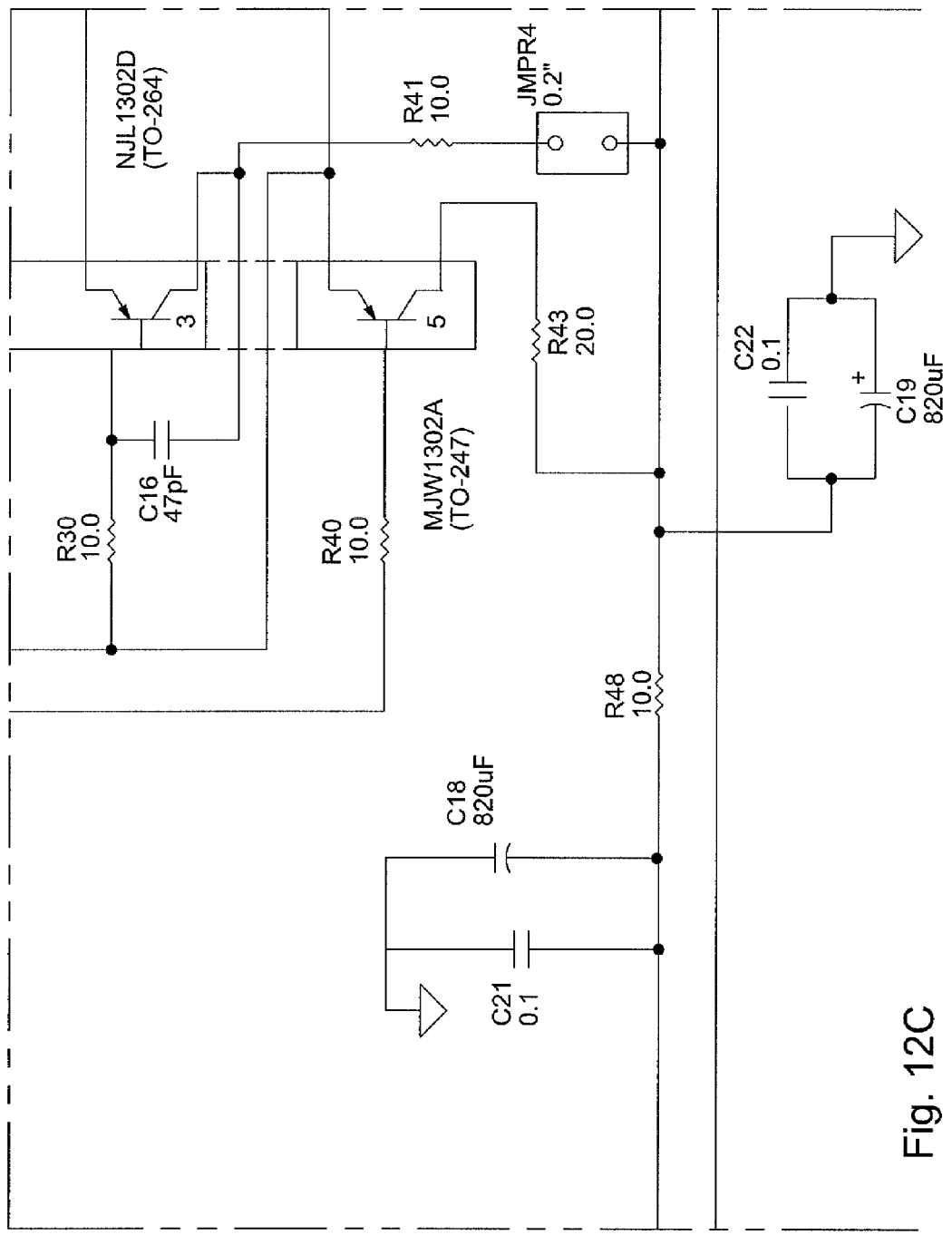
Figure 12D:
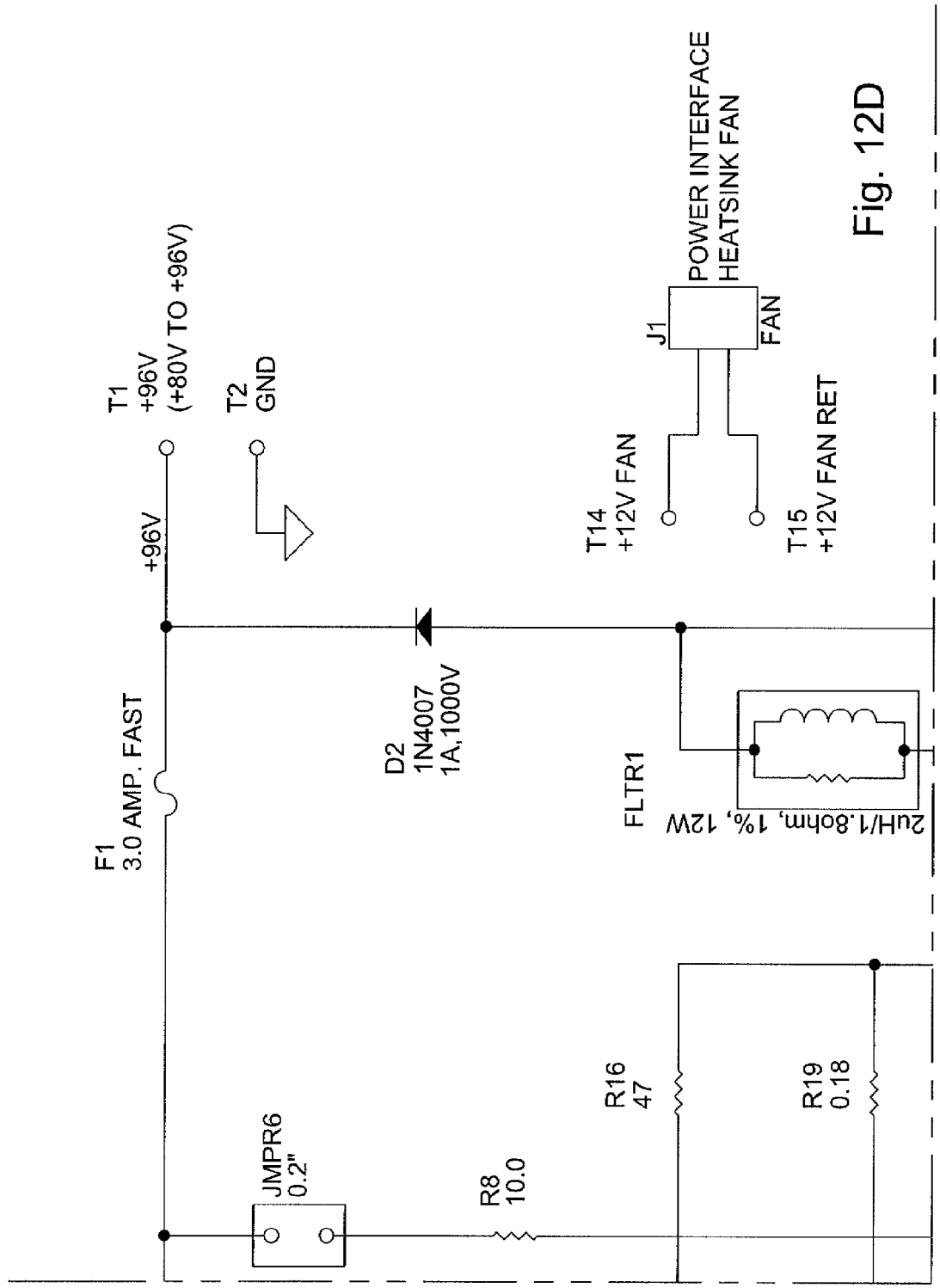
Figure 12E:
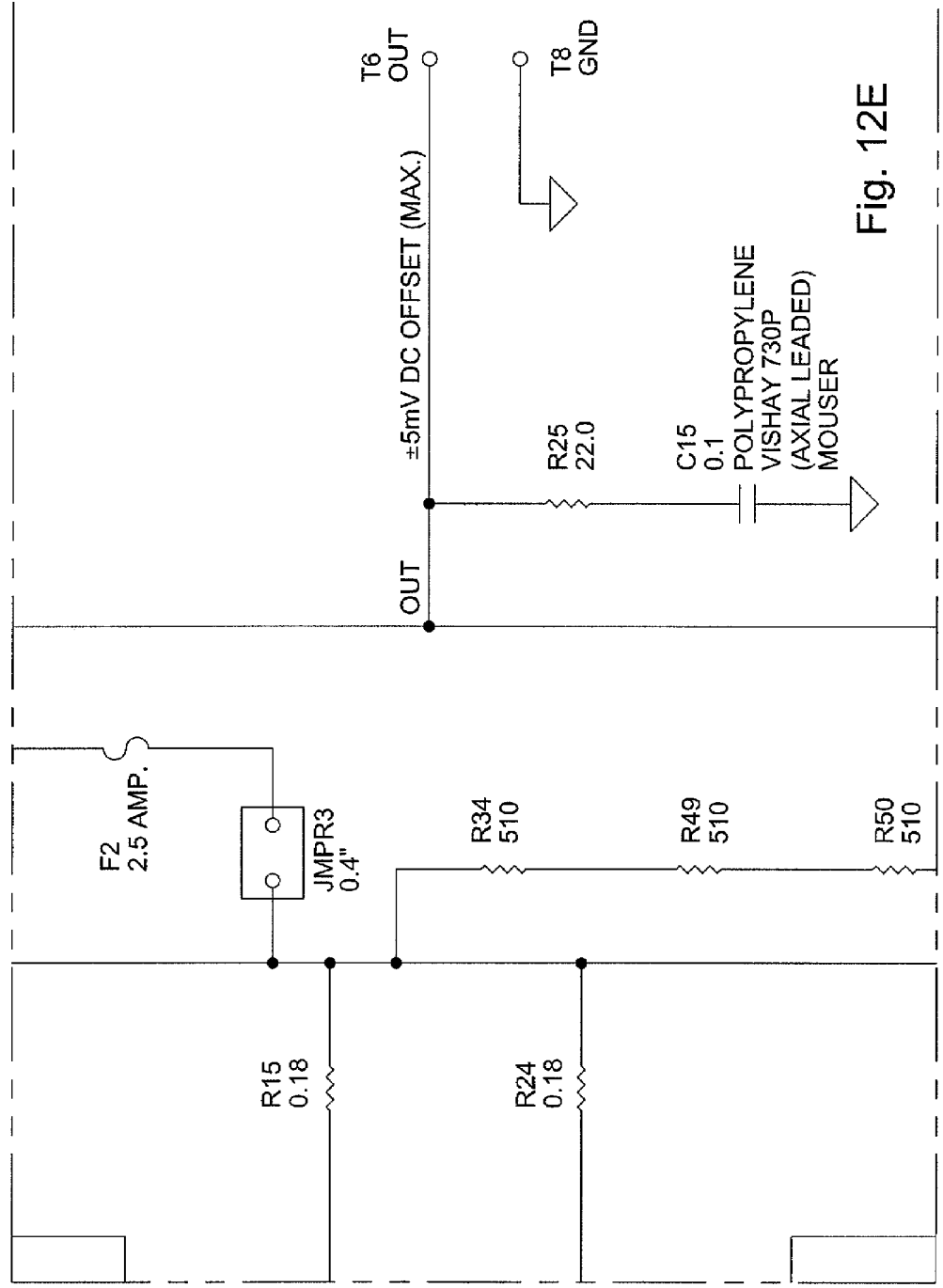
Figure 12F:
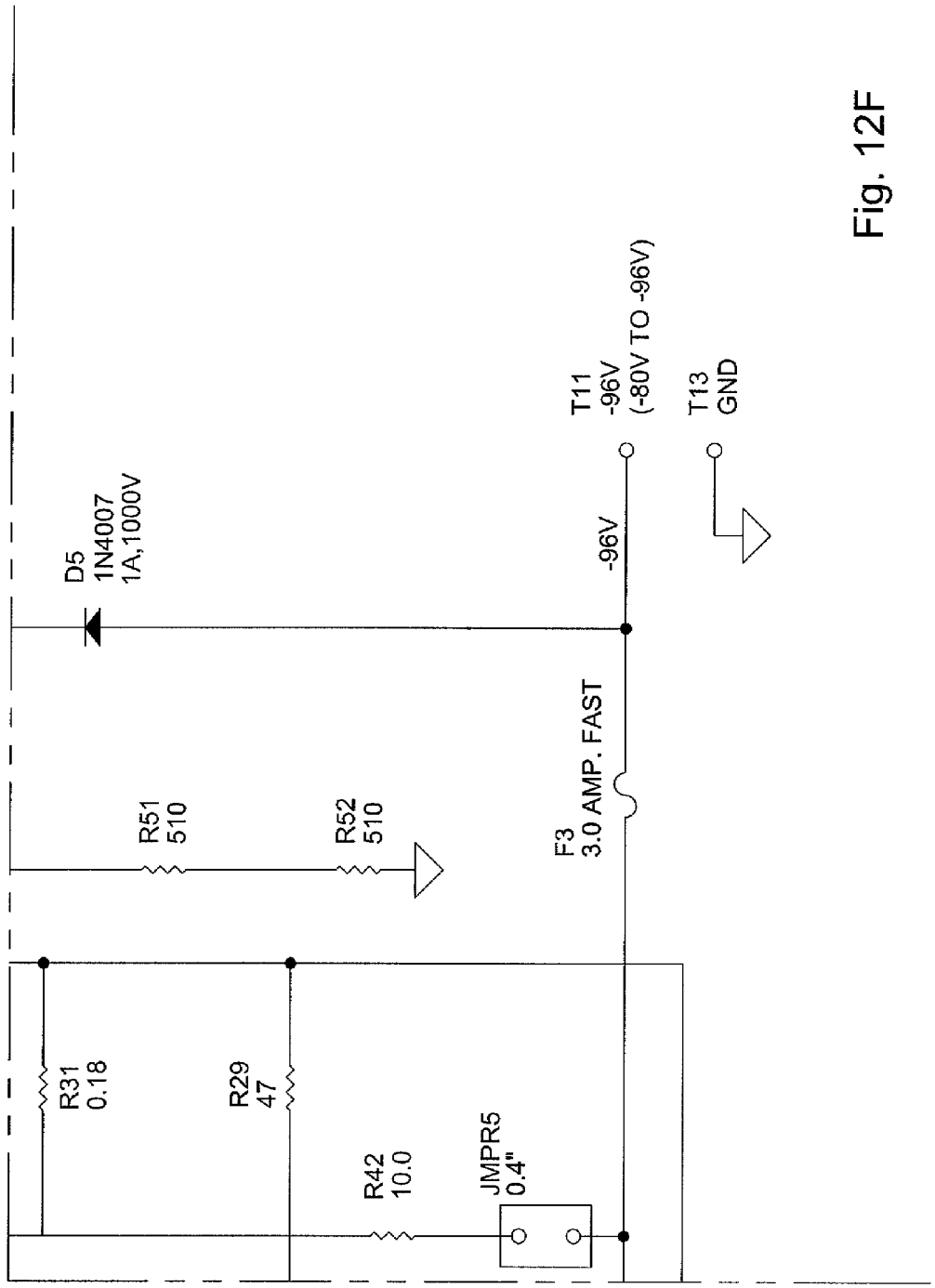

FIGS. 7-10, FIGS. 7A-7B, FIGS. 8A-8C, FIGS. 9A-9C, and FIGS. 10A-10F are schematic diagrams illustrating example embodiments of an actuator driving amplifier according to aspects of the present invention. FIG. 7 and FIGS. 7A-7B illustrate an exemplary amplifier front end. A differential input signal is accepted by terminals Vin(+) and Vin(−). The differential input signal is applied to the terminals of operational amplifier U1B via resistors R8 and R10. In one embodiment, capacitors C2 and C7 provide low pass filtering. An DC input offset is mixed in to the non-inverting input of U1B to provide either a zeroing effect, or to set the amplifier's input offset at a desired voltage. The DC input offset is supplied by precision voltage reference D1, which is low pass filtered by R3 and C3, and buffered by operational amplifier U1A. In a related embodiment opamps U1A and U1B are formed on a common substrate. In one embodiment, opamps U1A and U1B are implemented in an OPA-134-series device marketed by Burr-Brown/Texas Instruments.

Operational amplifier U1B provides a single-ended (i.e., non-differential, unbalanced) output that is fed via R13 to one of a pair of differential inputs of the exemplary high voltage input amplifier circuit depicted in FIG. 8 and FIGS. 8A-8C. The other input of the pair of differential inputs receives a feedback signal via R14. In one embodiment, frequency compensation can be selectively provided to the input receiving the feedback signal. The high voltage input amplifier circuit features a differential amplifier Q3. In one embodiment, the differential amplifier is implemented as a low noise, matched dual monolithic transistor such as, for example, a MAT02 device marketed by Analog Devices. Device Q4 provides a biasing current for the differential amplifier. Transistors Q1 and Q2 are configured in a common base arrangement to provide level shifting for embodiments in which differential amplifier Q3 cannot withstand the high voltage supply of +VDC−(−VDC). In the example embodiment depicted, the high voltage input amplifier produces a differential output at the collectors of Q1 and Q2 as illustrated.

FIG. 9 and FIGS. 9A-9C, illustrates an example high voltage level translator circuit fed by the output of the high voltage input amplifier circuit of FIG. 8 and FIGS. 8A-8C. The differential inputs HV DIFF-AMP INPUT (+) and HV DIFF-AMP INPUT (−) are directly coupled, respectively, to the base of Q5 and the base of Q6. The noninverting input at the base of Q5 is represented (in phase and amplitude) across the base and emitter of Q10 by operation of Q5 and common base amplifier Q8. When inverting input HV DIFF-AMP INPUT (−) is more negative, Q6 is driven on harder which, in turn, drives positive output +V OUTPUT VOLTAGE DRIVER to a more positive voltage. When noninverting input HV DIFF-AMP INPUT (+) is more positive, Q5 is driven on less hard which, in turn, drives Q10 less. Consequently, negative output −V OUTPUT VOLTAGE DRIVER is driven to a less negative (i.e., more positive voltage).

Referring to the high voltage output circuit depicted in FIG. 10 and FIGS. 10A-10F, positive output from the high voltage level translator circuit of FIG. 9 and FIGS. 9A-9C +V OUTPUT VOLTAGE DRIVER drives the high side of the output stage in a noninverting arrangement (i.e., a more positive input to the high side of the output stage drives that side of the output stage to a more positive voltage); whereas negative output from the high voltage level translator circuit of FIG. 9 and FIGS. 9A-9C −V OUTPUT VOLTAGE DRIVER drives the low side of the output stage in an inverting arrangement (i.e., a more negative input to the low side of the output stage drives that side of the output stage to a more positive voltage).

Referring again to FIG. 9 and FIGS. 9A-9C, capacitors C9, C10, and C11 are selectively used to provide high frequency compensation. In certain embodiments, high frequency compensation is employed; in other embodiments, no high frequency compensation is employed.

The circuit portion that includes transistors Q7 and Q9, and variable resistor R22 operates to trim the differential voltage between the positive and negative outputs from the high voltage level translator circuit +V OUTPUT VOLTAGE DRIVER and −V OUTPUT VOLTAGE DRIVER, respectively. The result is an adjustment of the quiescent current through the output driver transistors Q12-Q15. Notably, Q7 and Q9 operate with a negligible dynamic resistance, which provides a characteristic resembling a zener diode (i.e., an electronic zener circuit). In one embodiment, transistor Q7 is thermally coupled to the output driver transistors such that the setpoint of the electronic zener circuit corresponds to the thermal conditions. The arrangement of this embodiment operates to prevent thermal runaway of the output stage.

Referring again to the high voltage output circuit of FIG. 10 and FIGS. 10A-10F, the inputs +V INPUT VOLTAGE DRIVER and −V INPUT VOLTAGE DRIVER to the output signal driver transistors Q11 and Q16 are, respectively, the outputs from the high voltage level translator circuit +V OUTPUT VOLTAGE DRIVER and −V OUTPUT VOLTAGE DRIVER. In turn, Q11 drives the high side NPN output transistors Q12 and Q13; whereas Q16 drives low side PNP output transistors Q14 and Q15. Each output transistor includes a thermal tracking diode on the substrate. The thermal tracking-diodes are connected in series via variable resistor R29 across the voltage differential of +V INPUT VOLTAGE DRIVER and −V INPUT VOLTAGE DRIVER (which is controlled by the electronic zener circuit described above). In this configuration, the thermal tracking diodes provide a temperature signal representing the thermal conditions of the output transistors. The temperature signal, in turn, is used by the circuit to adjust the biasing of the output transistors.

The amplifier feedback is taken directly from the output node as illustrated, and fed to the high voltage input amplifier circuit illustrated in FIG. 8 and FIGS. 8A-8C via R14. Preloading resistor R36 maintains a load on the output of the amplifier to reduce small signal distortion. Load-isolating impedance FLTR1 functions substantially as load isolation impedance 640 that is described above. The series RC network consisting of R37 and C15 provides additional loading at high frequencies to compensate for inductive loading characteristics of the piezo actuator at those frequencies. Diodes D2 and D3 provide a discharge path for any power returned to the amplifier circuit by the piezo actuator when the piezo device operates momentarily in a sensing, rather than actuating mode.

FIGS. 11, 11A-11F, 12, and 12A-12F collectively depict a complete amplifier circuit according to one embodiment that utilizes many of the features described with reference to the circuits of FIGS. 7-10, FIGS. 7A-7B, FIGS. 8A-8C, FIGS. 9A-9C, and FIGS. 10A-10F.

Figure 13:
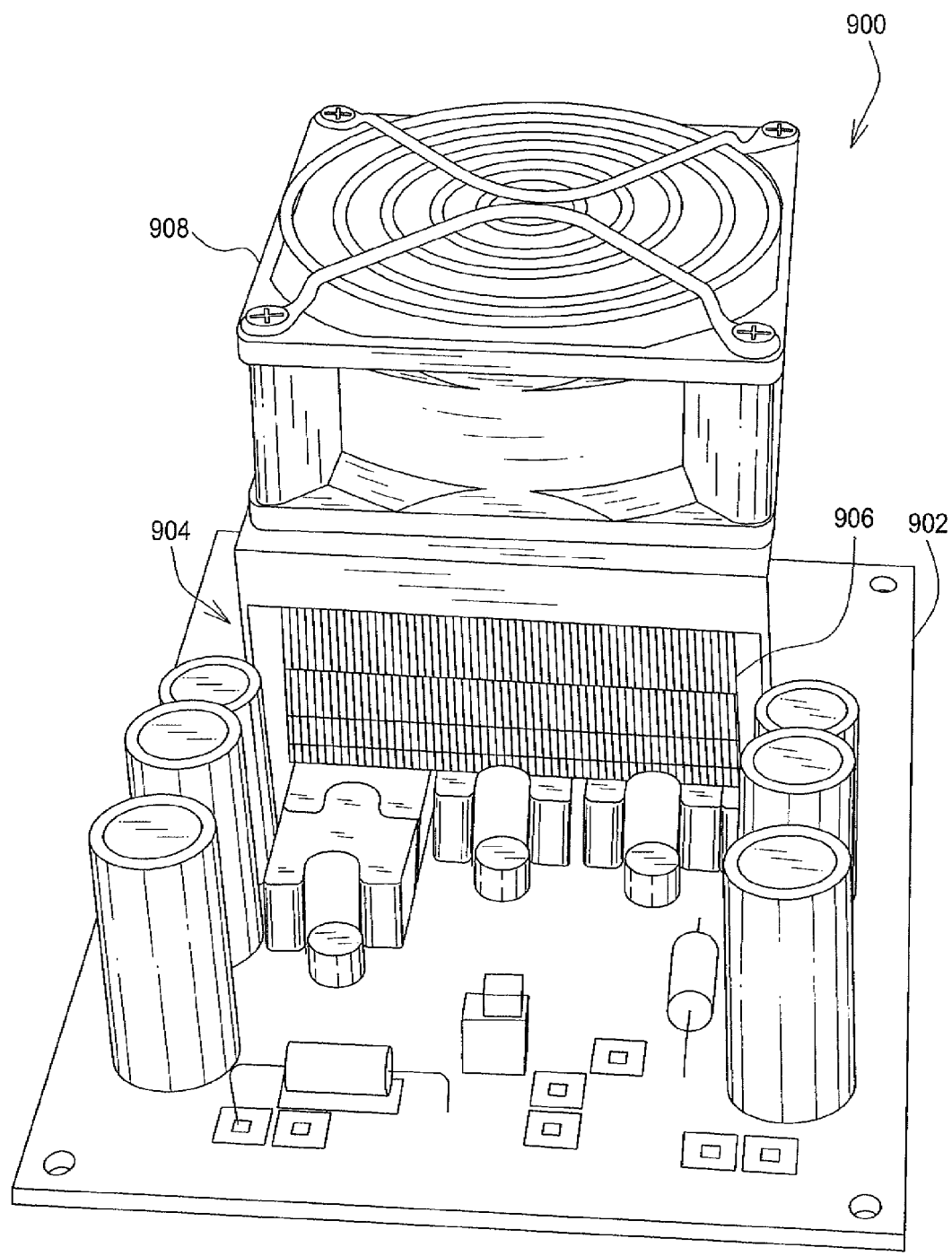
FIG. 13 is a perspective view diagram illustrating an assembly of a SPM actuator-driving amplifier according to one type of embodiment of the invention.

FIG. 13 illustrates an assembly of a piezo drive amplifier 900 according to one embodiment. Piezo drive amplifier 900 is a circuit card assembly that includes a printed circuit board 902 onto which the various electrical, electronic, and mechanical components are secured and electrically interconnected. Driver transistors 904 (not visible) are mounted to circuit board 902 beneath heatsink 906. In one embodiment, heatsink 906 is an aluminum design having a large plurality of fins to increase surface area and permit air flow facilitating heat transfer by convection. Heatsink 906 is thermally coupled to the driver transistors 904. Cooling fan 908 is mounted over heatsink 906 and operates to move air over the surface of heatsink 906. In a related embodiment, the heatsink and cooing fan are implemented using a conventional PC cooler module that is a pre-assembled heatsink and cooling fan part widely available for use on computer motherboards.

In such an embodiment, the use of active cooling by conveying air over a high-performance heat sink permits clustering of the output drive transistors 904. In turn, the clustered layout of the transistors facilitates maintaining uniform thermal conditions for all of the transistors, thereby improving amplifier reliability and performance. For instance, when the output transistors are all at nearly the identical temperature, no single transistor will exhibit thermal runaway before any other transistor. Since a thermal runaway event tends to drive the problem transistor even harder, in the situation where there exists a temperature gradient between transistors, that transistor tends to divert current away from the other transistors operated in parallel with it. The runaway transistor tends to fail in spite of there being other parallel transistors otherwise capable of distributing the current. The clustering arrangement facilitated by the use of active cooling thus avoids thermal runaway of individual devices.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A scanning probe microscope (SPM) system having a probe for measuring a sample, the SPM system comprising:
at least one position actuator that operates to generate relative motion between the probe and the sample while the SPM system collects data indicative of a property of the sample, wherein the relative motion includes a range of motion of at least 1 micron;
an actuator driving circuit that applies a drive signal to the at least one position actuator to cause the relative motion, wherein the actuator driving circuit includes at least one amplification stage with a substantially non-reactive feedback network limiting a gain of the at least one amplification stage; and
a load isolating impedance that is less than about ten ohms electrically situated between the actuator driving circuit and the at least one position actuator.

2. The SPM of claim 1, wherein the actuator driving circuit has a small signal bandwidth of at least 200 kHz with a phase lag of not more than 60 degrees within the small signal bandwidth.

3. The SPM of claim 1, wherein the actuator driving circuit has a small signal bandwidth of at least 200 kHz with a phase lag of not more than 40 degrees within the small signal bandwidth.

4. The SPM of claim 1, wherein the load isolating impedance includes a reactance.

5. The SPM of claim 1, wherein the load isolating impedance includes an impedance network in series with an output of the actuator driving circuit, and the impedance network includes a resistance in parallel with an inductance.

6. The SPM of claim 5, wherein the resistance is not greater than 10 ohms.

7. The SPM of claim 5, wherein the resistance is not greater than about 2 ohms.

8. The SPM of claim 5, wherein the impedance network comprises a resistor having a body and a pair of leads, and a coil of wire wound around at least a portion of the body and electrically connected to each of the leads.

9. The SPM of claim 1, wherein the load isolating impedance includes an impedance network arranged across an output of the actuator driving circuit, and the impedance network includes a resistance in series with a capacitance.

10. The SPM of claim 9, wherein values for the resistance and capacitance of the impedance network are selected such that the impedance network maintains a reactive load on the actuator driving circuit that is greater than a reactive load presented by the at least one position actuator.

11. A scanning probe microscope (SPM) system having a probe for measuring a sample, the SPM system comprising:

at least one position actuator that operates to generate relative motion between the probe and the sample while the SPM system collects data indicative of a property of the sample; and a driver circuit that has a substantially non-reactive feedback network limiting its gain, wherein the driver circuit drives the at least one position actuator with an effective output impedance of less than about 10 ohms over an operating bandwidth of the position actuator.

12. The SPM of claim 11, further comprising:

a control system configured in a feedback arrangement with the position actuator, the probe, and the driver circuit, wherein the control system dictates the relative motion in response to a probe-sample interaction based on the topography of the sample.

13. The SPM of claim 11, wherein the operating bandwidth includes zero hertz, and wherein the effective output impedance at zero hertz is less than 1 ohm.

14. The SPM of claim 11, wherein a small signal bandwidth of the driver circuit includes 200 kHz, and wherein the effective output impedance includes a reactance.

15. A scanning probe microscope (SPM) system having a probe for measuring a sample, the SPM system comprising:

at least one position actuator that operates to generate relative motion between the probe and the sample while the SPM system collects data indicative of a property of the sample, wherein the relative motion includes a range of motion of at least 1 micron;

an actuator driving circuit that applies a drive signal to the at least one position actuator to cause the relative motion, wherein the actuator driving circuit includes at least one amplification stage with a substantially non-reactive feedback network limiting a gain of the at least one amplification stage, and wherein the actuator driving circuit has a small signal bandwidth of at least 200 kHz with a phase lag of not more than 60 degrees within the small signal bandwidth; and a load isolating impedance that is less than about ten ohms electrically situated between the actuator driving circuit and the at least one position actuator, wherein the load isolating impedance includes:

a first impedance network in series with an output of the actuator driving circuit, the first impedance network including a resistance in parallel with an inductance; and a second impedance network arranged across an output of the actuator driving circuit, the second impedance network including a resistance in series with a capacitance, with values of the resistance and capacitance selected such that the second impedance network maintains a reactive load on the driver circuit that is greater than a reactive load presented by the at least one position actuator.

* * * * *